United States Patent
O'Connor et al.

(10) Patent No.: US 6,619,311 B2
(45) Date of Patent: Sep. 16, 2003

(54) MICROFLUIDIC REGULATING DEVICE

(75) Inventors: Stephen D. O'Connor, Pasadena, CA (US); Christoph D. Karp, Pasadena, CA (US)

(73) Assignee: Nanostream, Inc., Pasadena, CA (US)

( * ) Notice: Subject to any disclaimer, the term of this patent is extended or adjusted under 35 U.S.C. 154(b) by 0 days.

(21) Appl. No.: 10/127,081

(22) Filed: Apr. 19, 2002

(65) Prior Publication Data

US 2002/0166585 A1 Nov. 14, 2002

Related U.S. Application Data

(63) Continuation of application No. 09/985,943, filed on Nov. 6, 2001.
(60) Provisional application No. 60/246,138, filed on Nov. 6, 2000.

(51) Int. Cl.[7] .................................. G05D 7/01
(52) U.S. Cl. ................. 137/109; 137/118.06; 137/597; 251/61.1
(58) Field of Search ............................. 137/597, 595, 137/109, 118.06; 251/61.1

(56) References Cited

U.S. PATENT DOCUMENTS

| 4,676,274 | A | | 6/1987 | Brown ...................... 137/806 |
| 6,074,725 | A | | 6/2000 | Kennedy ................... 428/188 |
| 6,146,103 | A | * | 11/2000 | Lee et al. ..................... 417/50 |
| 6,293,012 | B1 | * | 9/2001 | Moles .................... 29/890.124 |
| 6,408,878 | B2 | * | 6/2002 | Unger et al. ............... 137/597 |

FOREIGN PATENT DOCUMENTS

| WO | WO 98/09315 | 4/1998 | ............ H01J/49/04 |
| WO | WO 99/19717 | 4/1999 | ............ G01N/25/22 |
| WO | WO 99/60397 | 11/1999 | ............ G01N/33/483 |

* cited by examiner

Primary Examiner—Stephen M. Hepperle
(74) Attorney, Agent, or Firm—Vincent K. Gustafson; Michael F. Labbee

(57) ABSTRACT

Microfluidic flow control devices are provided. In one embodiment, a regulating device includes overlapping channel segments separated by a deformable membrane in fluid communication with one another. Pressure differentials between the channel segments deform the membrane towards the channel with the lower pressure, thereby restricting flow. The restricted flow increases pressure in the low pressure channel, reversing the deformation of the membrane and regulating the pressure between the channels

32 Claims, 17 Drawing Sheets

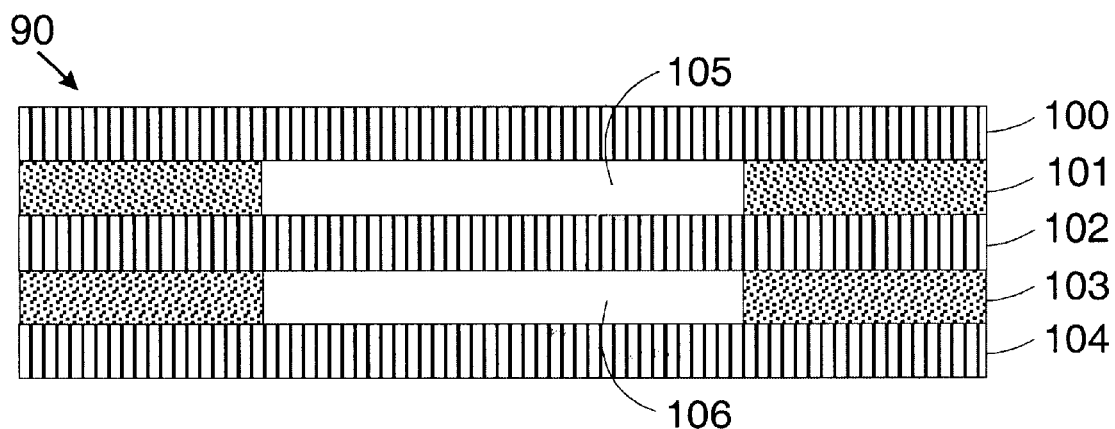
FIG._1A
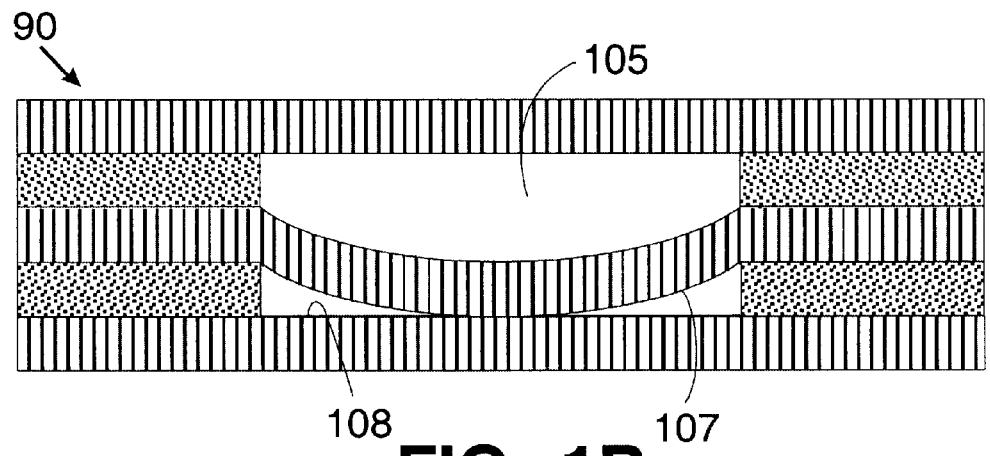
FIG._1B
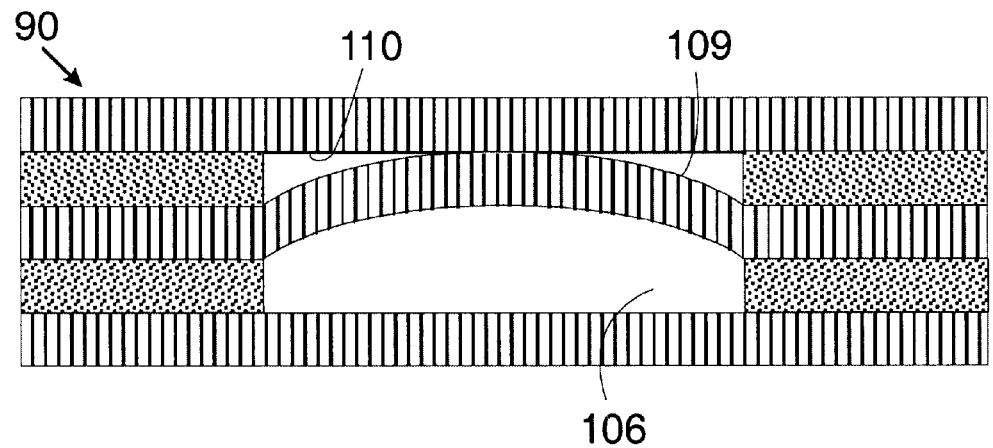
FIG._1C

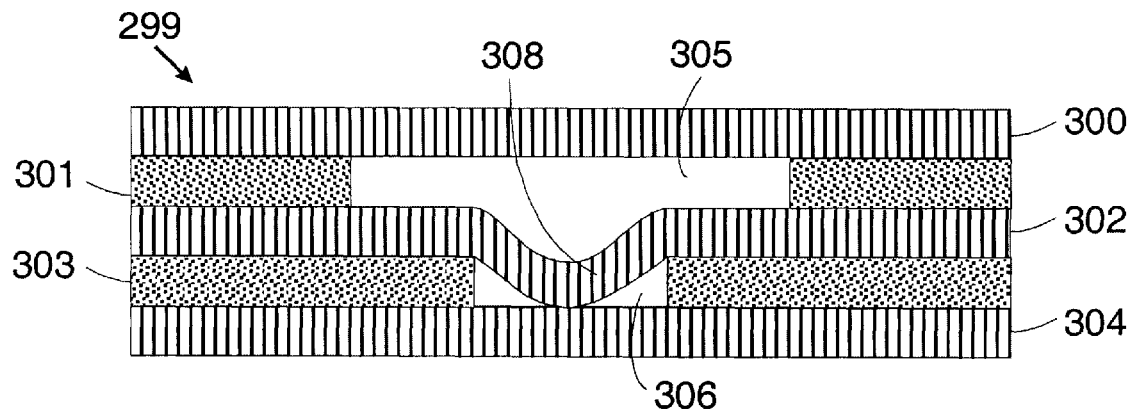
FIG._2A
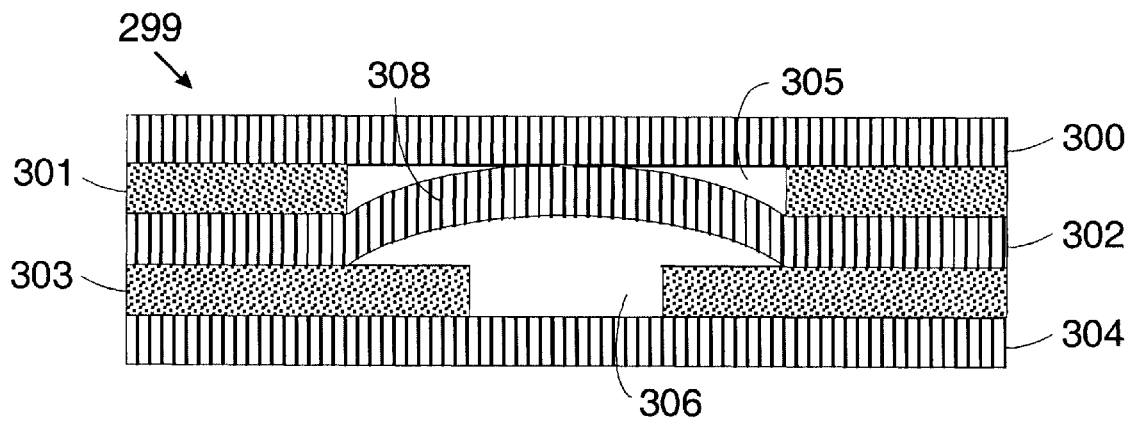
FIG._2B

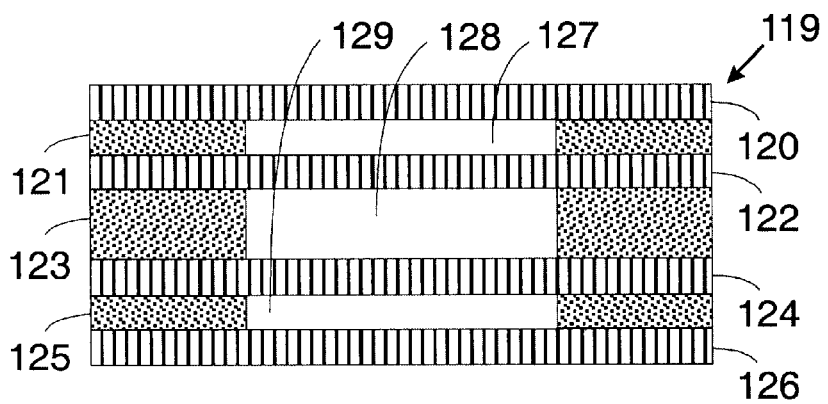
FIG._3A
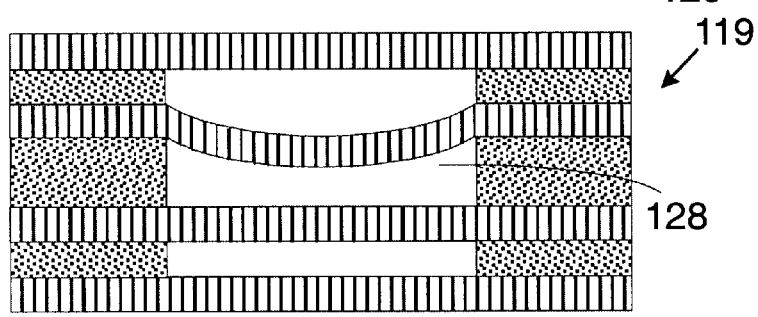
FIG._3B
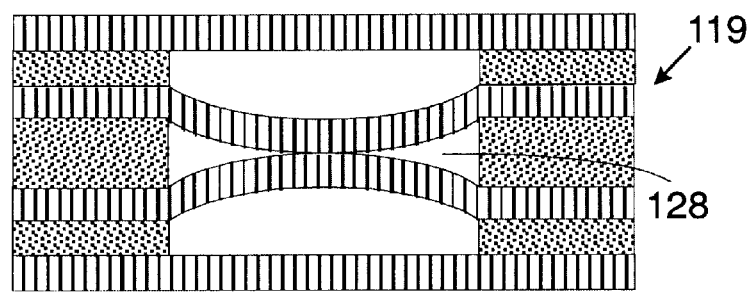
FIG._3C
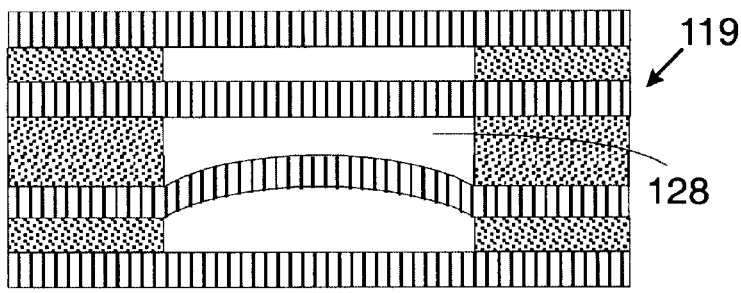
FIG._3D
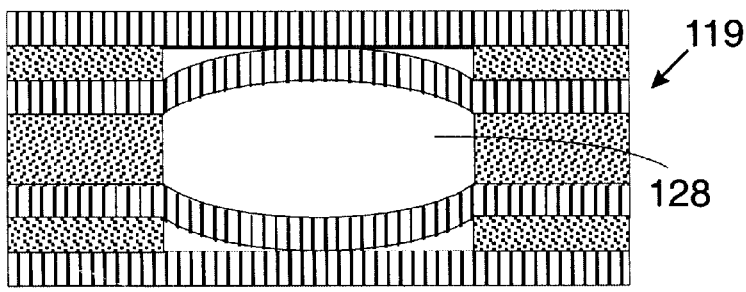
FIG._3E

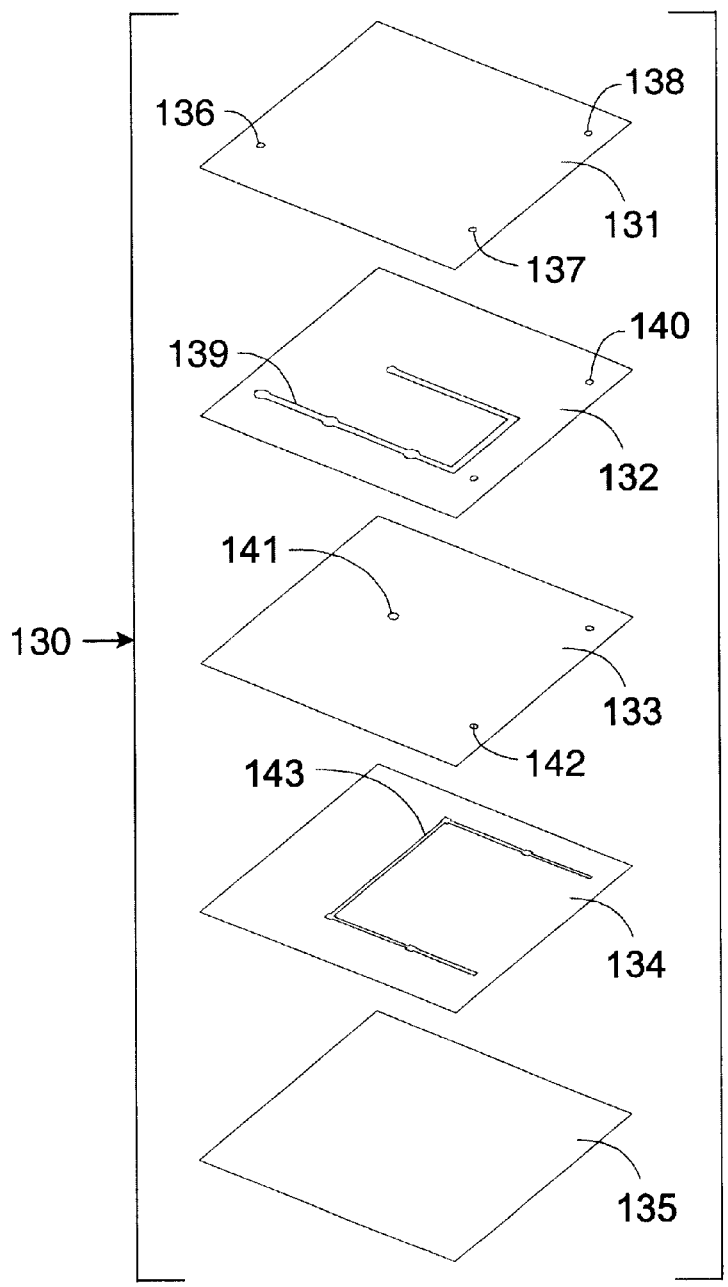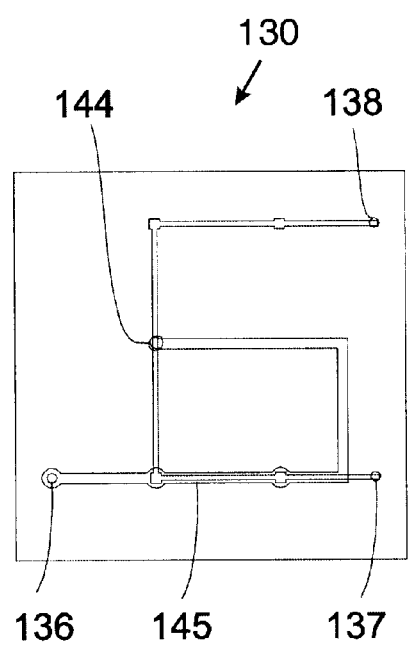
FIG._4A
FIG._4B

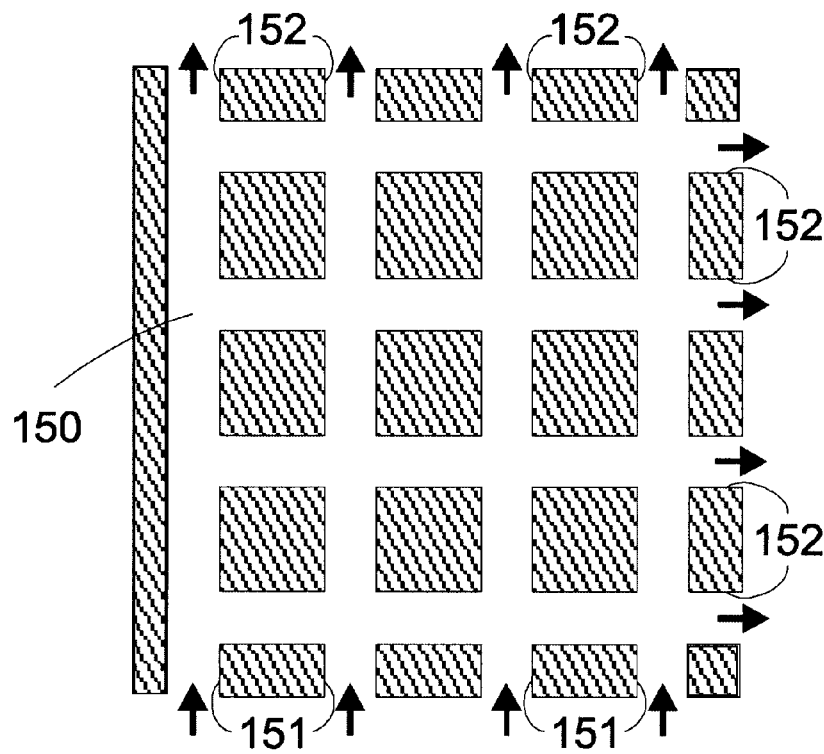
FIG._5A
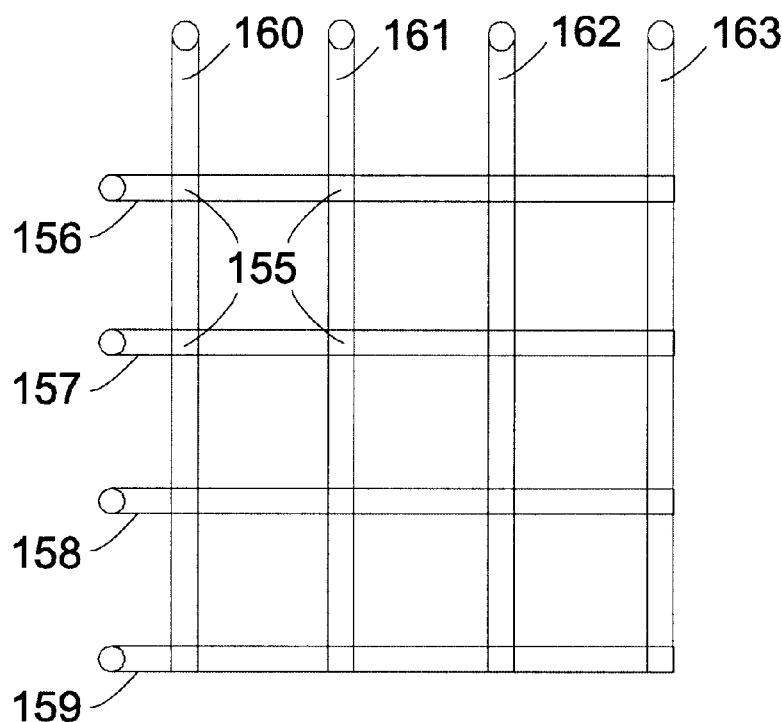
FIG._5B

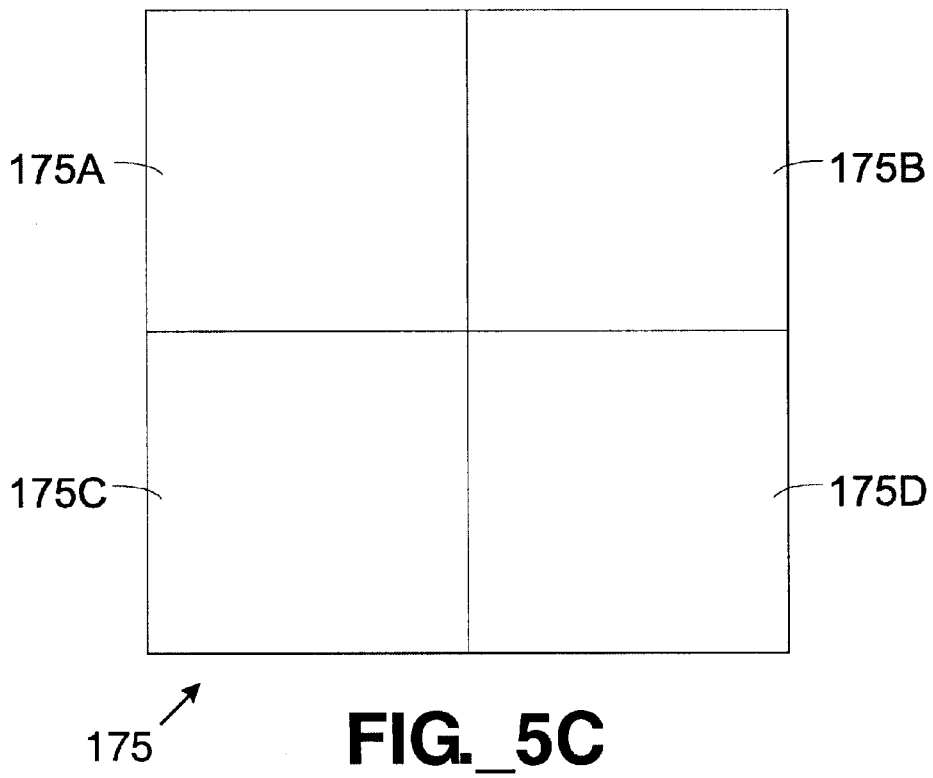
FIG._5C
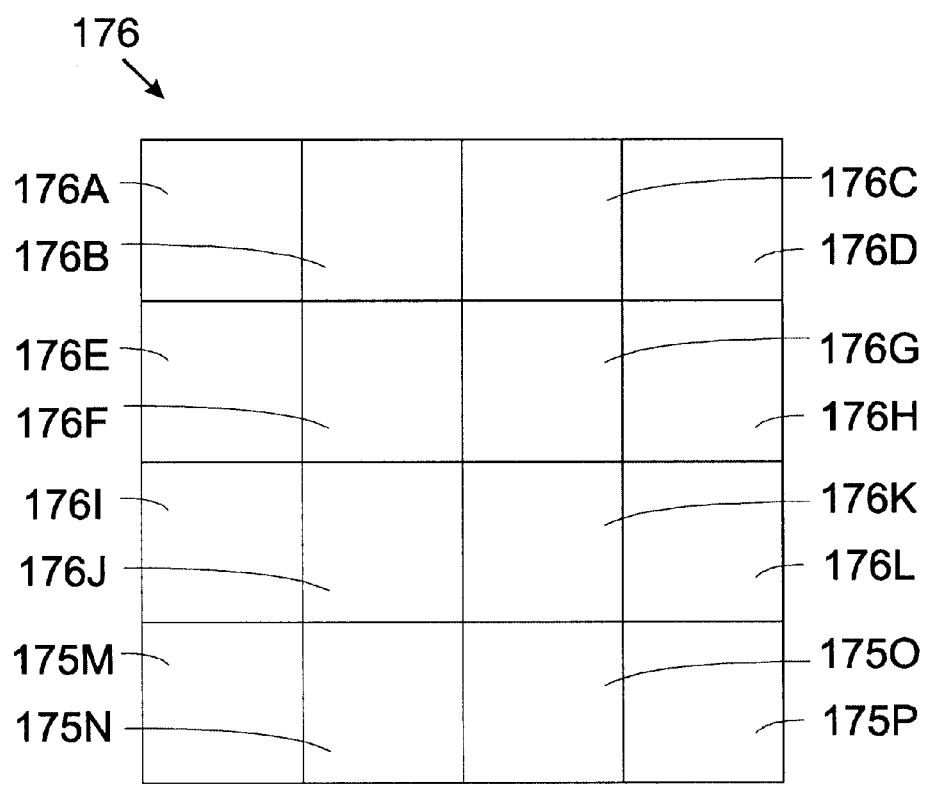
FIG._5D

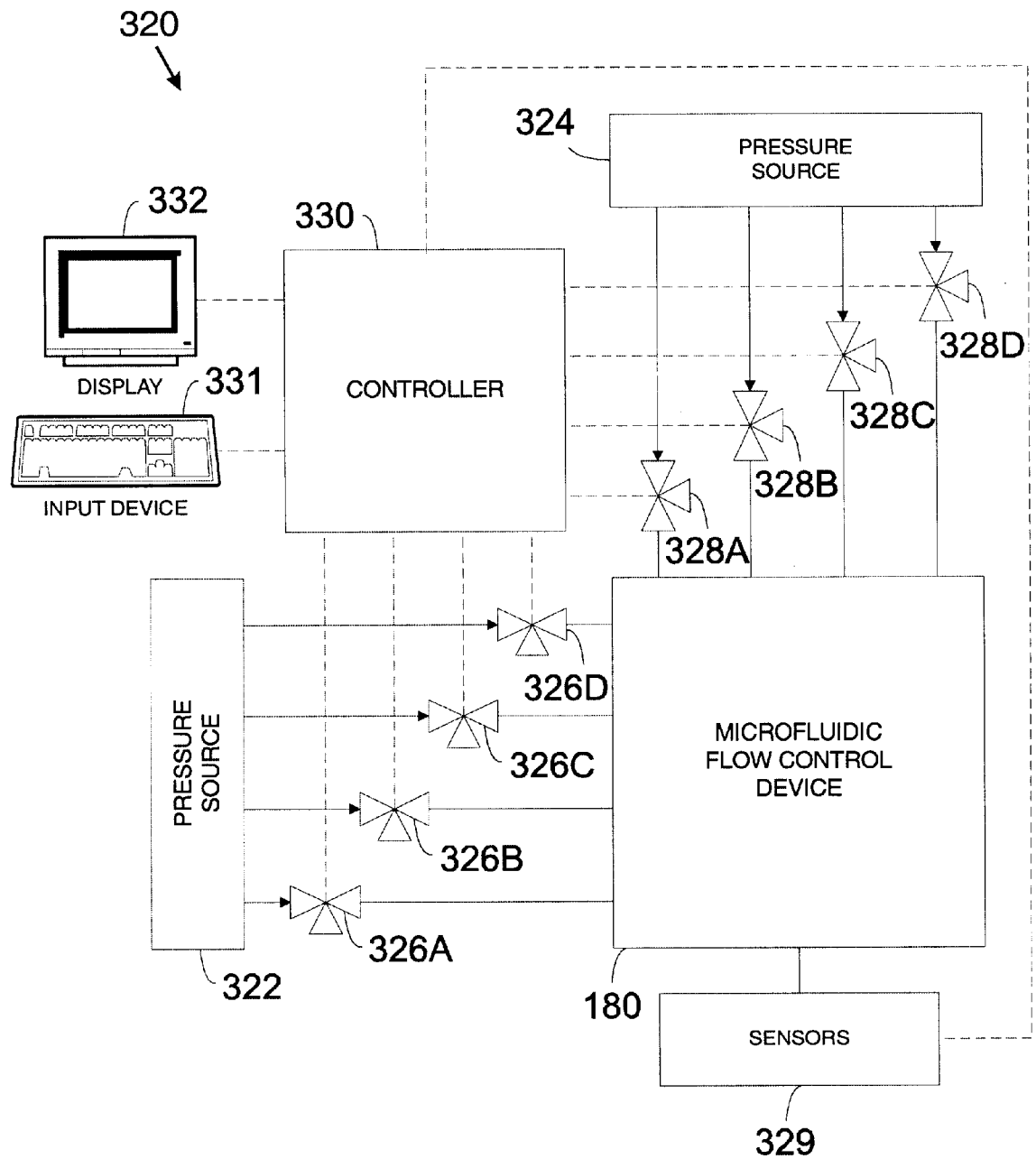
FIG._5F

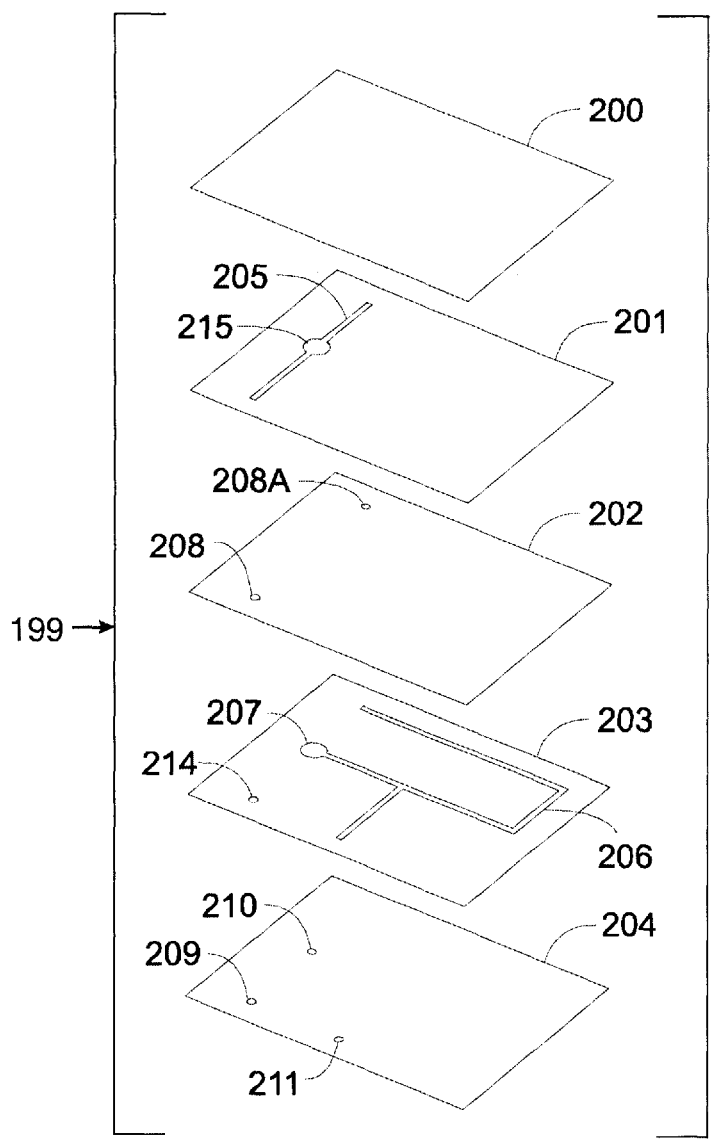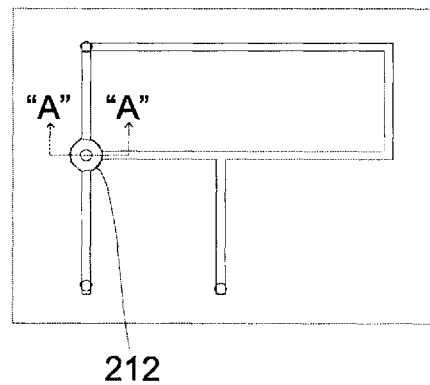
FIG._6A
FIG._6B

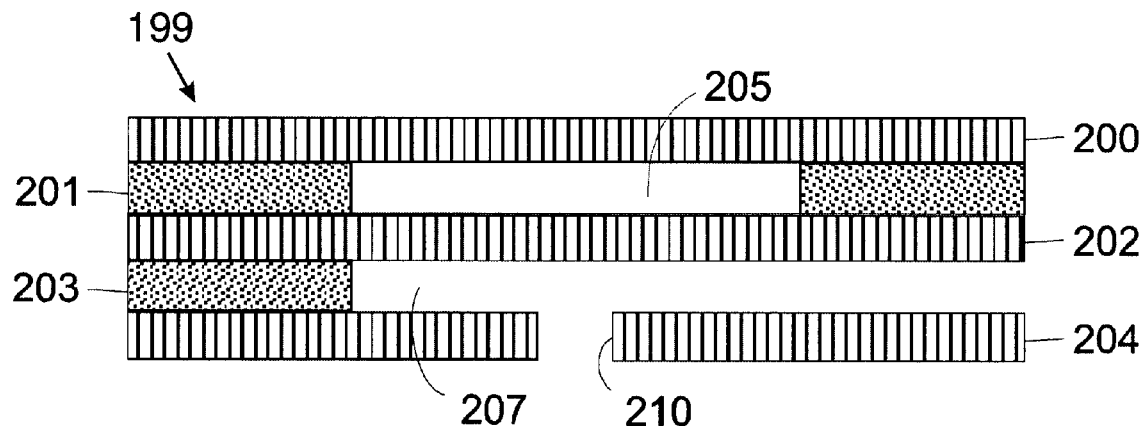
FIG._6C
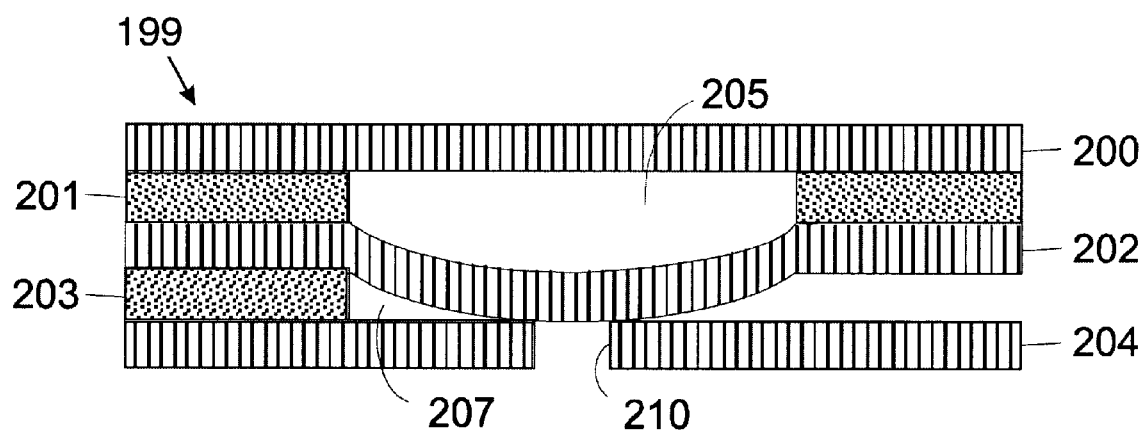
FIG._6D

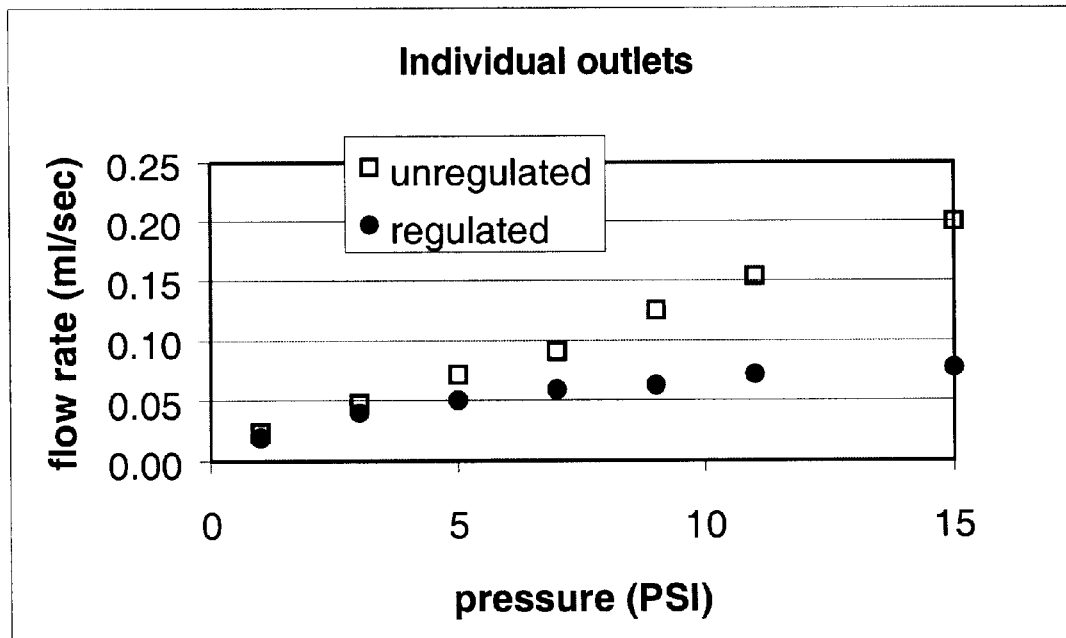
FIG._6E
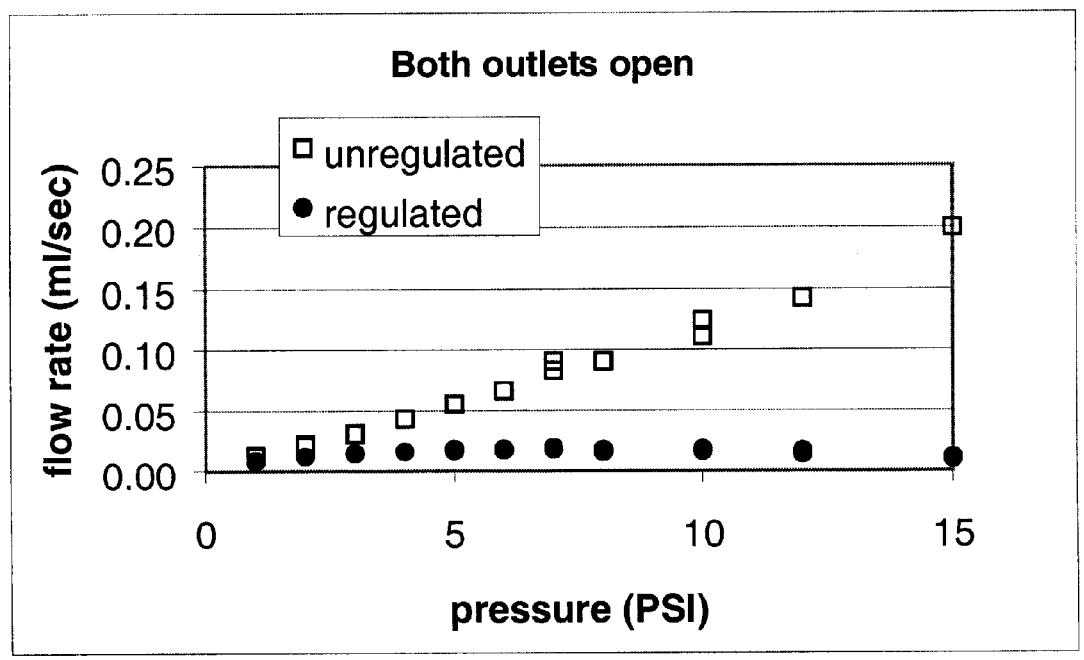
FIG._6F

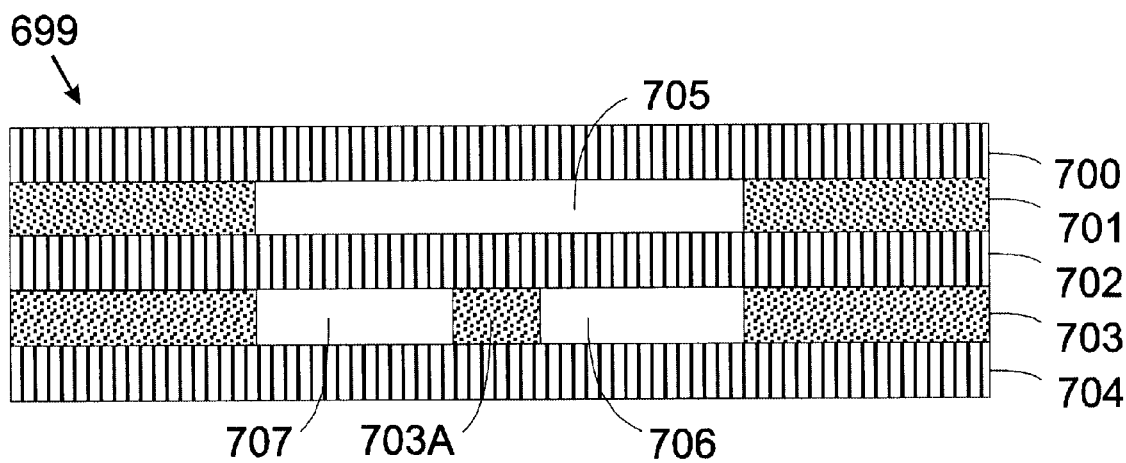
FIG._7A
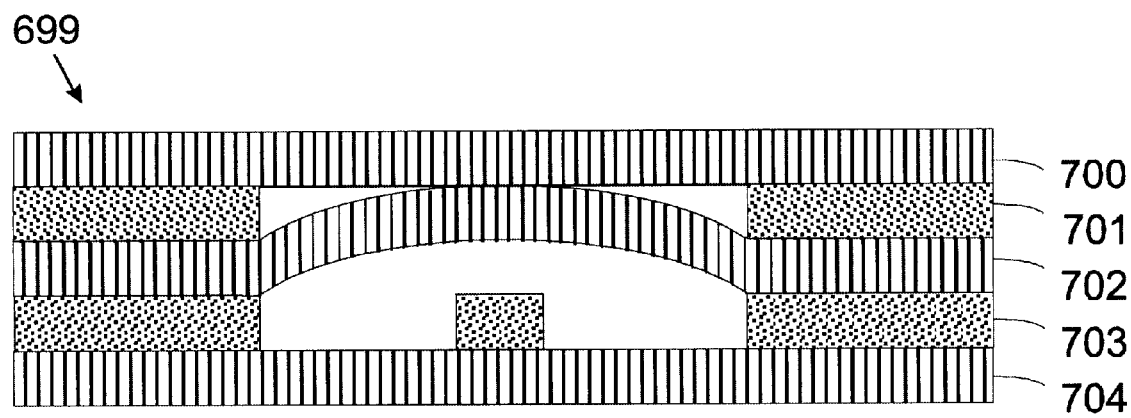
FIG._7B

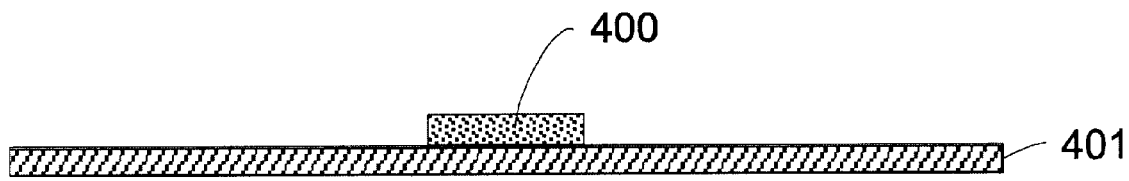
FIG._8A
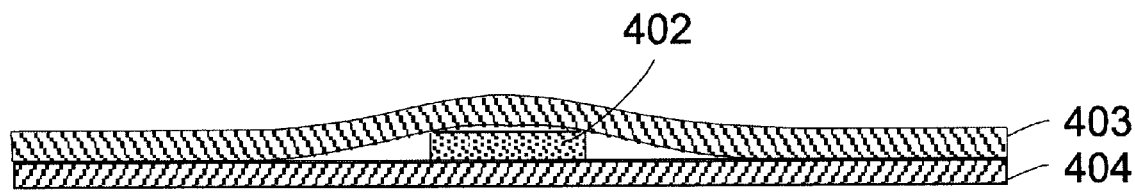
FIG._8B
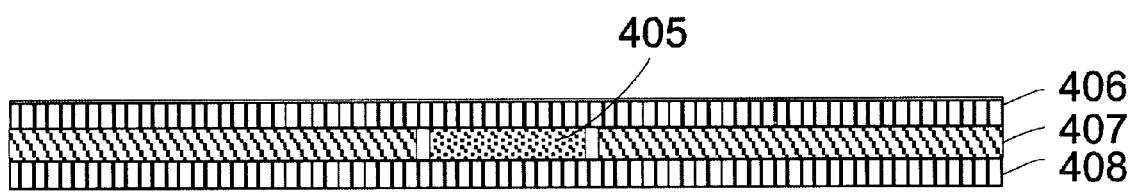
FIG._8C

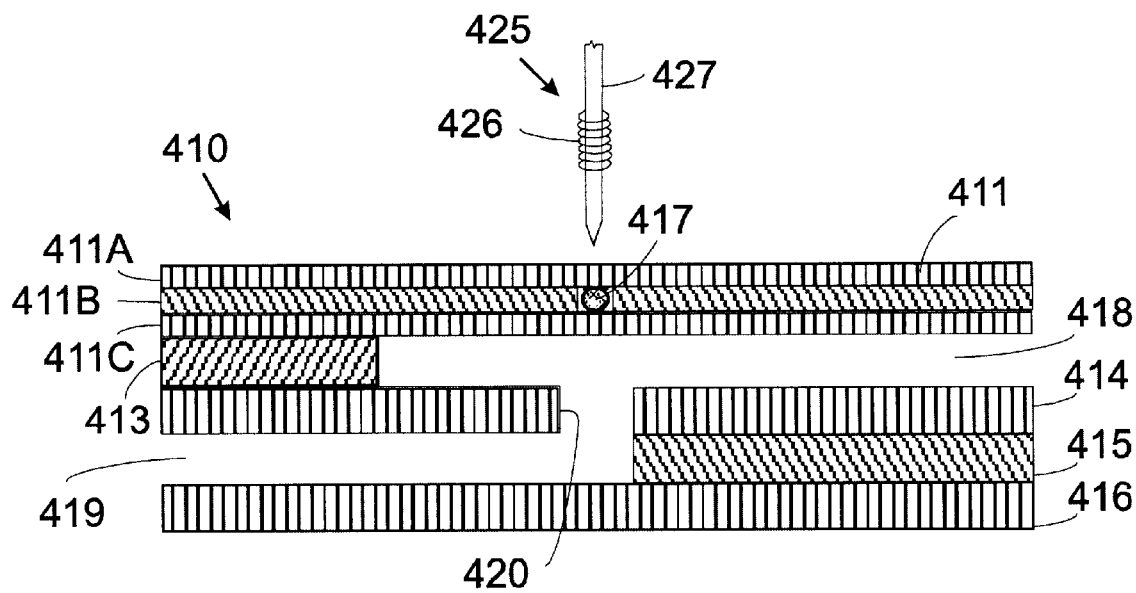
FIG._9A
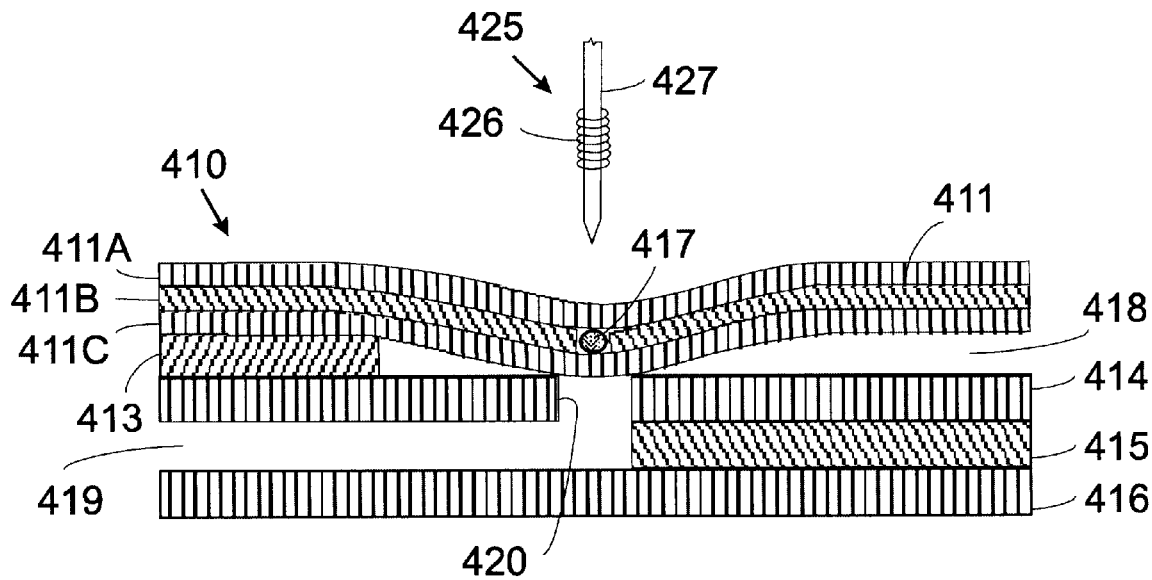
FIG._9B

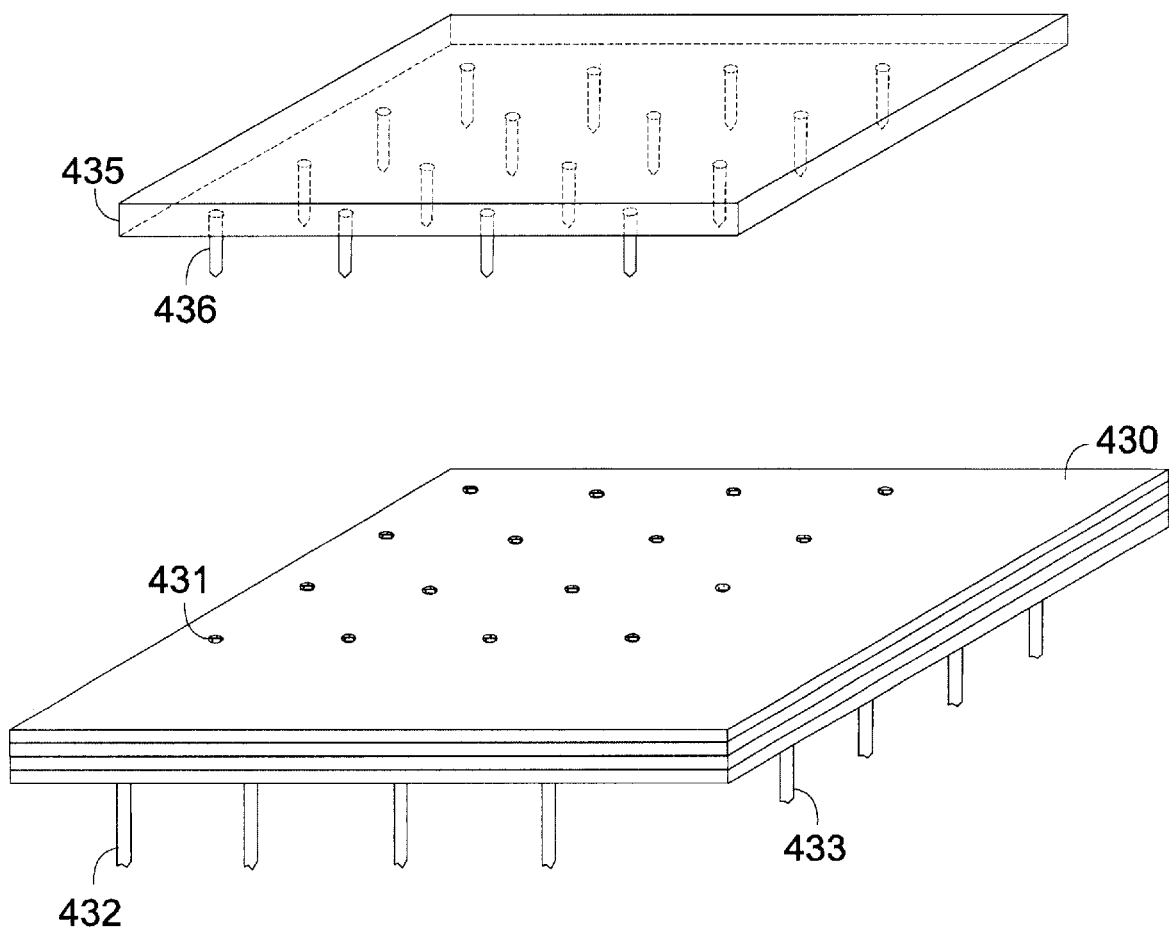
FIG._10

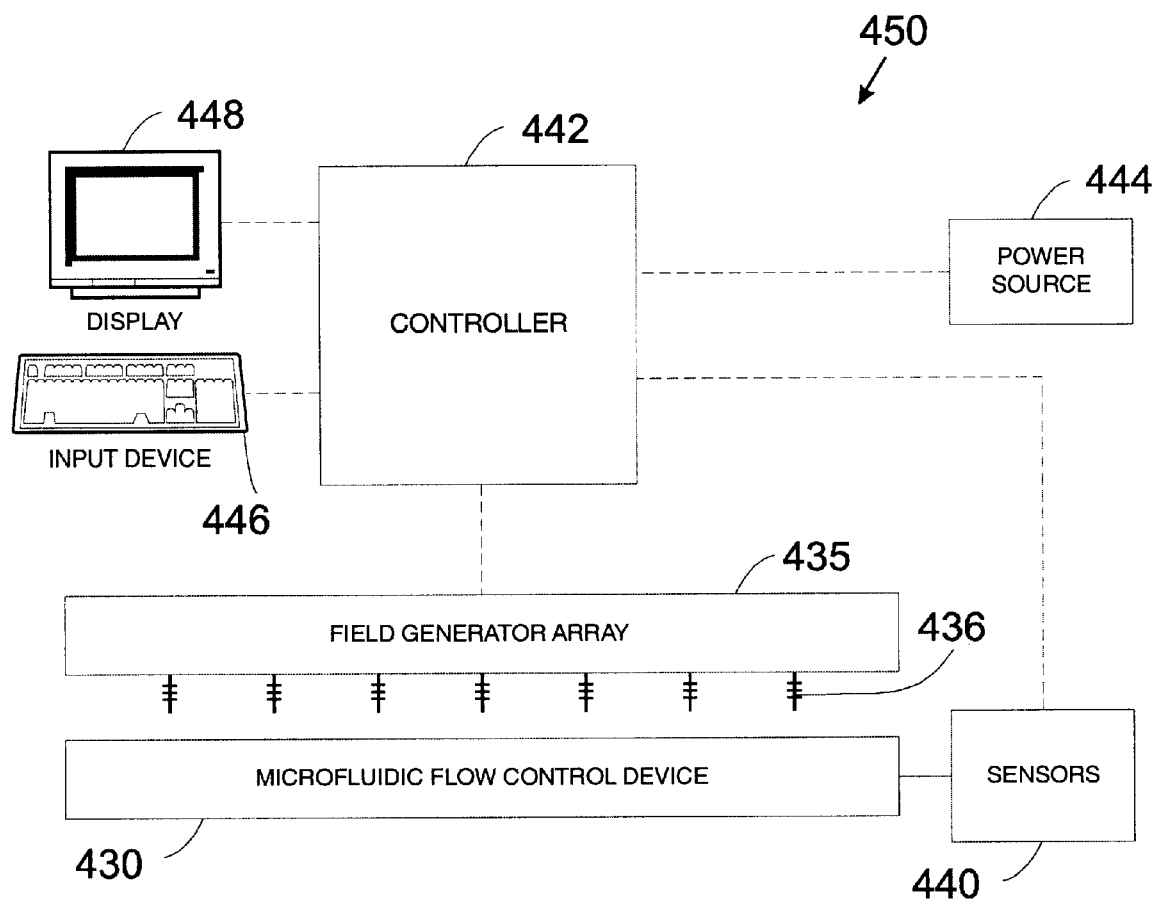
FIG._11

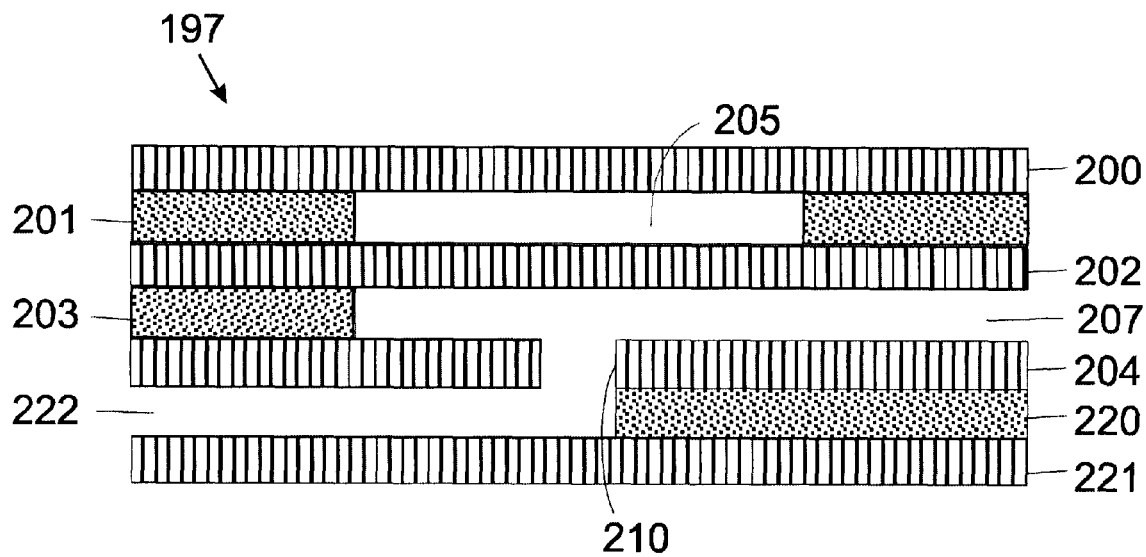
FIG._12A
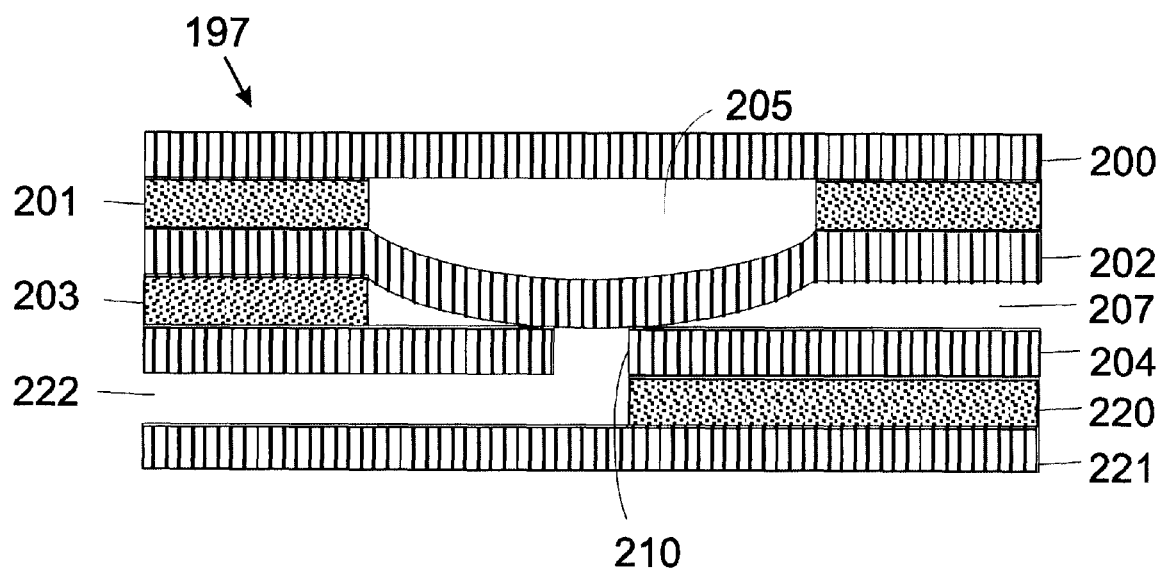
FIG._12B

MICROFLUIDIC REGULATING DEVICE

STATEMENT OF RELATED APPLICATION(S)

This application is a Continuation of U.S. application Ser. No. 09/985,943, filed Nov. 6, 2001 and currently pending, which claims benefit of U.S. application Ser. No. 60/246,138, filed on Nov. 6, 2000 and now abandoned.

FIELD OF THE INVENTION

The present invention relates to microfluidic devices and the control of fluid flow within those devices.

BACKGROUND OF THE INVENTION

There has been a growing interest in the manufacture and use of microfluidic systems for acquiring chemical and biological information. In particular, when conducted in microfluidic volumes, complicated biochemical reactions may be carried out using very small volumes of liquid. Among other benefits, microfluidic systems increase the response time of reactions, minimize sample volume, and lower reagent consumption. When volatile or hazardous materials are used or generated, performing reactions in microfluidic volumes also enhances safety and reduces disposal quantities.

Traditionally, microfluidic systems have been constructed in a planar fashion using techniques borrowed from the silicon fabrication industry. Representative systems are described, for example, in some early work by Manz et al (Trends in Anal. Chem. (1990) 10(5): 144–149; Advances in Chromatography (1993) 33: 1–66). These publications describe the construction of microfluidic devices using photolithography to define channels on silicon or glass substrates and etching techniques to remove material from the substrate to form the channels. A cover plate is bonded to the top of the device to provide closure.

More recently, a number of methods have been developed that allow microfluidic devices to be constructed from plastic, silicone or other polymeric materials. In one such method, a negative mold is first constructed, and then plastic or silicone is poured into or over the mold. The mold can be constructed using a silicon wafer (see, e.g., Duffy et al., Analytical Chemistry (1998) 70: 4974–4984; McCormick et al, Analytical Chemistry (1997) 69: 2626–2630), or by building a traditional injection molding cavity for plastic devices. Some molding facilities have developed techniques to construct extremely small molds. Components constructed using a LIGA technique have been developed at the Karolsruhe Nuclear Research center in Germany (see, e.g., Schomburg et al, Journal of Micromechanical Microengineering (1994) 4: 186–191), and commercialized by Micro-Parts (Dortmund, Germany). Jenoptik (Jena, Germany) also uses LIGA and a hot-embossing technique. Imprinting methods in polymethylmethacrylate (PMMA) have also been demonstrated (see, e.g., Martynova et al., Analytical Chemistry (1997) 69: 4783–4789). However, these techniques do not lend themselves to rapid prototyping and manufacturing flexibility. Moreover, the tool-up costs for such techniques are quite high and can be cost-prohibitive.

Typically, flow control within microfluidic devices has been provided through the application of electric currents to cause electrokinetic flow. Systems for providing such utility are complicated and require electrical contacts to be present. Additionally, such systems only function with charged fluids, or fluids containing electrolytes. Finally, these systems require voltages that are sufficiently high as to cause electrolysis of water, thus forming bubbles that complicate the collection of samples without destroying them. Therefore, there exists a need for a microfluidic device capable of controlling flow of a wide variety of fluids without using electrical currents.

Some of the basic challenges involved in operating microfluidic systems result from attempts to interface between conventional "macro-scale" devices and microfluidic components. Due to the very small cross-sectional area of microfluidic channels, flow through these channels can be quite sensitive to pressure variations. Assuming that an external pressure source is used to motivate fluid flow in a microfluidic system, a number of applications would benefit if the flow rate of a flowing fluid could be controlled in spite of variations in input pressure. For example, such control can be especially valuable in performing reactions such as chemical or biological synthesis. To reduce overall costs and provide versatility, it would be desirable to achieve controlled fluid flow within a microfluidic device using various low-precision pressure sources, such as, for example, a conventional manually-operated syringe or an inexpensive, low-precision syringe pump. Also in the interest of reducing costs, it would be desirable to provide controlled fluid flow in a microfluidic device with a minimum of moving parts or control components. Thus, there exists a need for a simple yet robust microfluidic regulating device capable of receiving fluid from a low-precision source and providing a controlled fluid flow rate in spite of fluctuations in input pressure.

A microfluidic device with limited (i.e., on-off) flow control capability is provided in U.S. Pat. No. 5,932,799 to Moles ("the Moles '799 patent"). There, polyimide layers enhanced with tin (between 400–10,000 ppm) are surface micromachined (e.g., etched) to form recessed channel structures, stacked together, and then thermally bonded without the use of adhesives. A thin, flexible valve member actuated by selective application of positively or negatively pressurized fluid selectively enables or disables communication between an inlet and an outlet channel. The valve structure disclosed in the Moles '799 patent suffers from numerous drawbacks that limit its utility, however. First, the valve is limited to simple on-off operation requiring a constant actuation signal, and is incapable of regulating a constant flow. Second, the valve is normally closed in its unactuated state. It is often desirable in microfluidic systems to provide normally open valve structures subject to closure upon actuation. Third, the Moles '799 patent teaches the fabrication of channels using time-consuming surface micromachining techniques, specifically photolithography coupled with etching techniques. Such time-consuming methods not only require high setup costs but also limit the ability to generate, modify, and optimize new designs. Fourth, the Moles '799 patent teaches only fabrication of devices using tin-enhanced polyimide materials, which limits their utility in several desirable applications. For example, polyimides are susceptible to hydrolysis when subjected to alkaline solvents, which are advantageously used in applications such as chemical synthesis. The inclusion of tin in the device layers may present other fluid compatibility problems. Finally, polyimides are generally opaque to many useful light spectra, which impedes their use with common detection technologies, and further limits experimental use and quality control verification.

Another microfluidic valve structure having limited utility is disclosed in WIPO International Publication Number WO 99/60397 to Holl, et al. There, a microfluidic channel is bounded from above by a thick, deformable elastic seal having a depressed region that protrudes through an opening above the channel. An actuated external valve pin presses against the elastic seal, which is extruded through the opening into the channel in an attempt to close the channel. This valve, however, suffers from defects that limit its utility. To begin with, it is difficult to fabricate an elastic seal having a depressed region to precisely fit through the opening above the channel without leakage. Additionally, the valve provides limited sealing utility because it is difficult to ensure that the extruded seal completely fills the adjacent channel, particularly in the lower corners of the channel. Further, the contact region between the external valve pin and the elastic seal is subject to frictional wear, thus limiting the precision and operating life of the valve.

Using conventional technologies, it is generally difficult to quickly generate and modify designs for robust microfluidic devices. To include flow control capability in such a device only elevates that difficulty. It would be desirable to provide a "generic" microfluidic platform that could be quickly and easily tuned with various components and/or materials to provide different flow control utilities depending on the particular application, taking into account varying design criteria such as the operating fluid, the flow rates, and the pressures involved. If available, such a platform would promote rapid prototyping and device optimization at a substantially reduced cost compared to conventional technologies.

Additionally, it would be desirable to enable flow through a microfluidic channel network to be externally controlled without the attendant drawbacks of electrokinetic or electrophoretic flow. In particular, it would be desirable to provide a channel network having multiple inlets and multiple outlets, and be able to selectively establish fluid flow paths through the network between one or more specific inlets and one or more specific outlets. If available, such a device could be used as a versatile fluid "switch." It would be particularly desirable if this fluid switching utility could be externally programmed so as to execute repetitive and/or sequential functions with minimal user interaction. Preferably, a fluid switching device or system would be simple and robust with a minimum number of parts subject to wear.

Finally, conventional "on-off" microfluidic valve structures such as the valve disclosed in the Moles '799 reference require constant application of a control signal, thus consuming external actuation resources for as long as a valve state is to be maintained. To reduce the consumption of external actuation resources and provide other capabilities including fluid logic functions, it would be desirable to provide robust microfluidic valves with "latching" capability, in other words, the ability to maintain position in an actuated state without continuous application of an actuation signal. These and other needs and desirable aspects are addressed herein.

SUMMARY OF THE INVENTION

In a first separate aspect of the invention, a microfluidic regulating device includes a first channel segment and a second channel segment defined in different layers of a microfluidic device and in fluid communication with one another. A membrane separates the channel segments at a regulatory region. In the presence of a pressure differential between the two channel segments, the membrane is deformed into the channel segment having a lower internal pressure, thus reducing fluid flow capability through the first or the second channel segment.

In another separate aspect of the invention, a multi-layer microfluidic regulating device includes a first channel segment and a second channel segment defined in different layers of a microfluidic device. The second channel segment is in fluid communication with the first channel segment, and a membrane separates the first channel segment and the second channel segment at a regulatory region. When a pressure differential is applied between the first channel segment and the second channel segment, the membrane deforms into and constricts the channel segment having a lower internal pressure.

In another separate aspect of the invention, a microfluidic regulating device includes a first device layer defining a first channel segment through its entire thickness, and a second device layer defining a second device layer through its entire thickness. The second channel segment has an inlet and a regulated outlet, and the first channel segment is in fluid communication with the inlet. A pressure responsive deformable membrane is disposed between at least a portion of the first channel segment and a portion of the second channel segment.

In another separate aspect of the invention, a microfluidic regulating device includes a first device layer defined through its entire thickness and a second device layer defined through its entire thickness. The first layer has an inlet and an outlet, and the second layer has an inlet and two outlets. A third device layer disposed between the first and second layers defines an aperture that permits communication between the first layer outlet and one of the second layer inlets. At least a portion of the first channel overlaps a portion of the second channel to form a regulatory region associated with either of the second layer outlets.

In another aspect of the invention, any of the foregoing separate aspects may be combined for additional advantage.

These and other aspects and advantages of the present invention will become apparent from the following detailed description of the preferred embodiments taken in conjunction with the figures.

BRIEF DESCRIPTION OF THE DRAWINGS

FIGS. 1A–1C are cross-sectional views of at least a portion of microfluidic device constructed from 5 layers of material, the device having a deformable membrane separating equally-sized upper channel region and a lower channel region. FIG. 1A illustrates the membrane in a neutral position. FIG. 1B illustrates the membrane being deflected toward and into the lower channel region. FIG. 1C illustrates the membrane being deflected toward and into the upper channel region.

FIGS. 2A–2B are cross-sectional views of at least a portion of a 5-layer microfluidic device having a larger upper channel region and a smaller lower channel region. FIG. 2A illustrates the membrane being deformed toward and into the smaller, lower channel region. FIG. 2B illustrates the membrane being deformed toward and into the larger, upper channel region.

FIGS. 3A–3E are cross-sectional views of at least a portion of a microfluidic device having three separate channel regions (an upper, a central, and a lower channel region) divided by two deformable membranes (an upper and a lower membrane). FIG. 3A illustrates both membranes in neutral positions. FIG. 3B illustrates the upper deformable membrane being deflected toward and into the central channel region. FIG. 3C illustrates both the upper and the lower deformable membrane being deflected toward and into the central channel region. FIG. 3D illustrates the lower deformable membrane being deflected toward and into the central channel region. FIG. 3E illustrates both the upper and lower deformable membrane being deflected away from the central channel region, namely, the upper deformable membrane being deflected toward and into the upper channel region, and the lower deformable membrane being deflected toward and into the lower channel region.

FIG. 4A is an exploded perspective view of a five-layer microfluidic device having a pressure-activated regulating valve that controls fluid flow within the device. FIG. 4B is a top view of the assembled device of FIG. 4A.

FIG. 5A is a top view of a portion of one layer of at least a portion of a microfluidic device, the layer having a network of interconnected channels. FIG. 5B is a top view of portions of two additional, superimposed layers of the same device shown in FIG. 5A, the two additional layers defining control channels for directing fluid flow within the channel network illustrated in FIG. 5A. FIG. 5C is a top view of a membrane that may be used in the device illustrated in FIGS. 5A–5B, the membrane composed of different membrane materials in four regions. FIG. 5D is a top view of a membrane similar to the membrane illustrated in FIG. 5C, but composed of different membrane materials in sixteen regions. FIG. 5F is a schematic illustration of a microfluidic flow control system including the microfluidic device of FIG. 5E coupled to at least one pressure source and a controller, among other components.

FIG. 6A is an exploded perspective view of a five-layer microfluidic device capable of delivering a relatively constant flow rate of fluid over a large range of pressures. FIG. 6B is a top view of the assembled device of FIG. 6A. FIG. 6C is a cross-sectional view of a portion of the microfluidic device of FIGS. 6A–6B along section lines "A—A" shown in FIG. 6B, with the regulatory region in the open position. FIG. 6D provides the same cross-sectional view as FIG. 6C, but with the regulatory region in the closed position. FIG. 6E is a chart showing the flow rates achieved at the unregulated and regulated outlets of the device shown in FIGS. 6A–6D over a range of input pressures, with each outlet tested separately while the other outlet was sealed. FIG. 6F is a chart showing the flow rates at both the unregulated and regulated outlets of the device shown in FIGS. 6A–6D over a range of input pressures, measured with both outlets open.

FIG. 7A is a cross-sectional view of a portion of a microfluidic device having three channel segments that meet at a regulatory region and that are separated by a single deformable membrane. FIG. 7B provides the same cross-sectional view as FIG. 7A, but with the membrane deflected toward and into the upper channel segment.

FIG. 8A is a cross-sectional view of a deformable membrane having a magnetic element affixed to the membrane. FIG. 8B is a cross-sectional view of a deformable membrane formed with two membrane layers laminated around a magnetic element. FIG. 8C is a cross-sectional view of a deformable membrane formed with a central magnetic element, two outer membrane layers and a central stencil layer.

FIG. 9A is a cross-sectional view of a magnetic field generating element microfluidic flow control device and at least a portion of a microfluidic flow control device having a magnetic element laminated within a membrane layer, the membrane being in a relaxed state. FIG. 9B provides the same cross-sectional view as FIG. 9A, but with the membrane in a deformed state to prevent flow between two microfluidic channels within the flow control device.

FIG. 10 is a perspective view of a magnetic field generator array disposed above a microfluidic flow control device having multiple fluid inlets and outlets and multiple magnetic elements associated with flexible membranes to provide flow control utility.

FIG. 11 is a schematic illustration of a microfluidic flow control system showing interconnections between a microfluidic flow control device, a magnetic field generator array, and a controller, among other components.

FIG. 12A is a cross-sectional view of at least a portion of a microfluidic device having a deformable membrane disposed above an aperture permitting fluid communication between two channels. FIG. 12B provides the same cross-sectional view as FIG. 12A, but with the membrane deformed to seal the aperture and prevent fluid communication between the two channels.

DETAILED DESCRIPTION OF PREFERRED EMBODIMENTS OF THE INVENTION

Definitions

Figure 5E:
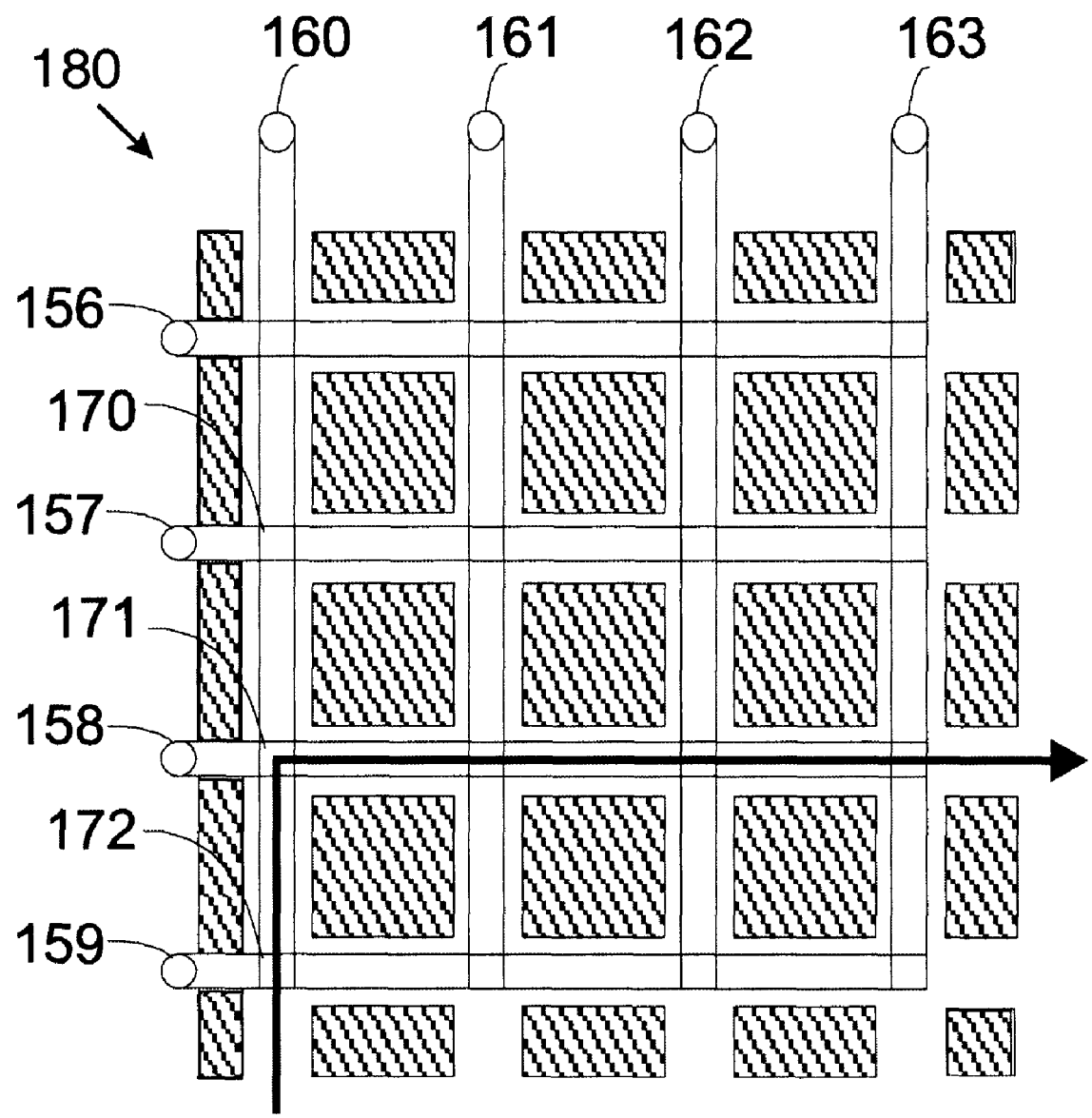
FIG. 5E is a top view of the superimposed layer portions of FIGS. 5A–5B and two membranes assembled into a microfluidic device, with schematic illustration of the device being operated to define one possible fluid flow path.

The term "channel" as used herein is to be interpreted in a broad sense. Thus, it is not intended to be restricted to elongated configurations where the transverse or longitudinal dimension greatly exceeds the diameter or cross-sectional dimension. Rather, the terms are meant to include cavities, tunnels, or chambers of any desired shape or configuration through which liquids may be directed. Such a fluid cavity may, for example, comprise a flow-through cell where fluid is to be continually passed or, alternatively, a chamber for holding a specified, discrete amount of fluid for a specified amount of time. "Channels" may be filled or may contain internal structures comprising valves or equivalent components.

The term "channel segment" as used herein refers to a region of a channel.

A "change in channel segment shape and geometry" indicates any change in the dimensions of a channel segment. For instance, the channel segment can become smaller, larger, change shape, be completely closed, be partially closed, be permanently restricted, etc.

The term "microfluidic" as used herein is to be understood, without any restriction thereto, to refer to structures or devices through which fluid(s) are capable of being passed or directed, wherein one or more of the dimensions is less than 500 microns.

The term "stencil" as used herein refers to a material layer that is preferably substantially planar, through which one or more variously shaped and oriented portions has been cut or otherwise removed through the entire thickness of the layer, and that permits substantial fluid movement within the layer (e.g., in the form of channels or chambers, as opposed to simple through-holes for transmitting fluid through one layer to another layer). The outlines of the cut or otherwise removed portions form the lateral boundaries of microstructures that are formed upon sandwiching a stencil between substrates and/or other stencils.

Fabrication of Microfluidic Devices

Microfluidic devices providing flow control utility according to the present invention may be fabricated in various ways using a wide variety of materials. In an especially preferred embodiment, microfluidic devices according to the present invention are constructed using stencil layers to define channels and/or chambers. As described in further detail in co-pending U.S. application Ser. No. 09/453,029 filed Dec. 1, 1999, which is hereby incorporated by reference as if fully set forth herein, a stencil layer is preferably substantially planar and has microstructure cut through the layer. For example, a computer-controlled plotter modified to accept a cutting blade may be used to cut various patterns through a material layer. Alternatively, a computer-controlled laser cutter may be used. As further alternatives, conventional stamping, cutting, and/or molding technologies may be employed to form stencil layers. The wide variety of materials that may be used to fabricate microfluidic devices using sandwiched stencil layers include polymeric, metallic, and/or composite materials, to name a few. Notably, use of stencil-based fabrication methods enables a particular device design to be rapidly "tuned" or optimized for particular operating parameters, since different material types and thicknesses may be readily used and/or substituted for individual layers within a device. The ability to prototype devices quickly with stencil fabrication methods permits many different variants of a particular design to be tested and evaluated concurrently.

When assembled in a microfluidic device, the top and bottom surfaces of stencil layers may mate with one or more adjacent stencil or substrate layers to form a substantially enclosed device, typically having one or more inlet ports and one or more outlet ports. In one embodiment, one or more layers of a device are comprised of single- or double-sided adhesive tape, although other methods of adhering stencil layers may be used. A portion of the tape (of the desired shape and dimensions) can be cut and removed to form channels, chambers, and/or apertures. A tape stencil can then be placed on a supporting substrate, between layers of tape, or between layers of other materials. In one embodiment, stencil layers can be stacked on each other. In this embodiment, the thickness or height of the channels can be varied by varying the thickness of the stencil (e.g., the tape carrier and the adhesive material thereon) or by using multiple substantially identical stencil layers stacked on top of one another. Various types of tape are useful with this embodiment. Suitable tape carrier materials include but are not limited to polyesters, polycarbonates, polytetrafluoroethlyenes, polypropylenes, and polyimides. Such tapes may have various methods of curing, including curing by pressure, temperature, or chemical or optical interaction. The thicknesses of these carrier materials and adhesives may be varied.

Alternatively, microfluidic devices according to the present invention are fabricated from materials such as glass, silicon, silicon nitride, quartz, or similar materials. Various conventional machining or micromachining techniques such as those known in the semiconductor industry may be used to fashion channels, vias, and/or chambers in these materials. For example, techniques including wet or dry etching and laser ablation may be used. Using such techniques, channels, chambers, and/or apertures may be made into one or more surfaces of a material or penetrate through a material.

Still further embodiments may be fabricated from various materials using well-known techniques such as embossing, stamping, molding, and soft lithography.

In addition to the use of adhesives or single- or double-sided tape discussed above, other techniques may be used to attach one or more of the various layers of microfluidic devices useful with the present invention, as would be recognized by one of ordinary skill in attaching materials. For example, attachment techniques including thermal, chemical, or light-activated bonding; mechanical attachment (such as using clamps or screws to apply pressure to the layers); or other equivalent coupling methods may be used.

Microfluidic Membrane Valves

In various embodiments of the present invention, membranes are used in microfluidic devices to provide flow control utility. In one embodiment, a microfluidic device includes a first microfluidic channel segment and a second microfluidic channel segment that are separated by a deformable membrane at a regulatory region. The channels may be defined in horizontal layers of a device, with the deformable membrane forming a separate horizontal layer separating the channel layers. The channels can overlap at any suitable angle. The channels may be orthogonal, thus limiting the area of the overlap region, or they may be substantially parallel. The first and second channels also can be in fluid communication. Where the channels are in fluid communication, the use of the terms first channel segment and second channel segment refer to regions forming a channel disposed on different layers of the device. A change in relative pressure between the first and second channels results in deformation of the membrane separating the channels. The membrane is deformed towards the channel segment with lower relative pressure. The membrane can partially block flow of the fluid through the channel segment with lower relative pressure or can substantially block flow of the fluid through the channel segment with lower relative pressure. The degree of deformation of the deformable membrane is related to the differential pressure between the first and second channels. Generally, the greater the differential pressure, then the greater the observed deformation of the deformable membrane.

FIGS. 1A–1C illustrate at least a portion of a microfluidic device 90 having a deformable membrane 102 that is responsive to changes in pressure between two channel segments 105, 106. The channel segments 105, 106 may be defined in stencil layers 101, 103 disposed between outer layers 100, 104. The deformable membrane 102 separates the first channel segment 105 defined in layer 101 from the second channel segment 106 defined in layer 103. When the pressures in channels 105 and 106 are substantially the same, then the deformable membrane 102 adopts a neutral position, as shown in FIG. 1A. If the pressure in channel segment 105 is increased, or the pressure in channel segment 106 substantially decreased, then the deformable membrane 102 will deform towards channel segment 106, as shown in FIG. 1B. When a sufficient differential pressure is attained, the deformable membrane 102 (specifically the lower surface 107 of the membrane 102) may contact the upper surface 108 of the outer layer 104. When the pressure in channel segment 106 is substantially increased or that in channel segment 105 substantially decreased, the deformable membrane 102 may deform into the channel segment 105, as shown in FIG. 1C. When a sufficient differential pressure is attained, the deformable membrane 102 (specifically, the upper surface 109) will contact the lower surface 110 of substrate layer 100.

As noted previously, the channel segment-containing portion of the device 90 can be constructed using any suitable materials, by any suitable technique. In a particularly preferred embodiment, a microfluidic device is constructed with sandwiched stencil layers. The layers of the device containing channel segments may also be constructed from etched silicon, molded polymers, or using other materials or fabrication methods known to one skilled in the art of making microfluidic devices. For example, in the device 90 illustrated in FIGS. 1A–1C, the channel segment 105 could be surface etched into a single integral substrate substituted for separate layers 100 and 101. Likewise, channel segment 106 could be etched into a single integral substrate substituted for separate layers 103 and 104.

Microfluidic devices described herein may be constructed using still further techniques. In certain embodiments, channels are constructed in materials using etching, embossing, or molding techniques. Two or more different elements may be constructed. Then, the multiple elements may be assembled face-to-face with a deformable membrane disposed between them. The channels in the two etched or embossed devices may overlap in certain areas of the completed device with the deformable intermediary layer between the channel segments. Additionally, one or more apertures may be defined in the intermediate layer to serve as vias connecting the channels in the upper and lower devices. More complicated systems can be constructed.

Control of the properties of the microfluidic device can be achieved by varying the deformable membrane material. The material can be elastically deformable or can be inelastically deformable. Suitable membrane materials include papers, foils and polymers. In a preferred embodiment, the membrane is a polymer including, for example, polyesters, polycarbonates, polytetrafluoroethylenes, polypropylenes, polyimides (e.g., KAPTON®) and polyesters (e.g., MYLAR®), silanes (e.g., PDMS) and polymethylmethacrylate (PMMA). A more rigid material will deflect less readily due to a change in pressure, while a more malleable material will deflect more easily. A membrane material also can be chosen based on its ability to perform repeated deformation cycles.

The sensitivity of microfluidic device to changes in differential pressure may also be controlled by varying the thickness of the deformable membrane. Generally, a thinner membrane material will be more easily deformed and will respond more easily to changes in differential pressure. A thicker membrane will generally be less easily deformed and will be less sensitive to changes in relative pressure. The thickness or height of the channel segment into which the deformable channel segment moves also will impact the fluid control performance of the system.

Another technique for adjusting the sensitivity of the microfluidic system to changes in relative pressure is to change the area of the regulatory region or deformable membrane. Adjacent microfluidic channels or chambers separated by a deformable membrane may be fashioned in a wide variety of sizes, shapes, and geometries. Channel or chamber segments can overlap in a perpendicular format, at an angle or along a length of channel segment that is parallel. Channels within a regulator region may be formed with constant widths or variable widths. One example of a regulatory region is provided in FIGS. 6A–6B, in which the regulatory region 207 is circular.

The areas of adjacent channel segments opposite the membrane at the regulatory region may also be different from one another. The larger the deformable membrane, for example, the more easily it provide substantially complete blockage of fluid flow in the adjacent channel segment. FIGS. 2A–2B show at least a portion of a microfluidic device 299 having, at the valve location, a relatively large channel segment 305 and a smaller channel segment 306 separated by deformable membrane 302. When the relative pressure in the larger channel segment 305 is higher than that in the smaller channel segment 306, the membrane 302 in the valve region deforms toward and into the smaller channel segment 306, as shown in FIG. 2A. The small relative size of channel segment 306 means that the deformable membrane 302 only reduces the available cross section of channel segment 306 to about half its original size. However, when the relative pressure in channel segment 306 is higher than the pressure in channel segment 305, then the membrane 302 deforms toward and into the larger channel segment 305, as shown in FIG. 2B. Because of the relatively large area of the channel 305 bounded by the deformable portion of the membrane 302, the membrane 302 is able to move more easily into channel segment 305, thereby significantly changing the cross section of the channel segment 305. For example, a membrane having a deformable portion 5 mm in diameter will deflect across a 3-mil (75 microns) channel segment more readily than a 2 mm diameter deformable membrane portion, because there is less of a percentage of deformation of the larger membrane.

In a preferred embodiment, a channel subject to fluidic control defines an aperture opposite and substantially aligned with the center of a deformable membrane. In such a configuration, a fluid flow path is provided in a direction parallel to the direction of travel of the deformable membrane. For example, FIG. 6C shows at least a portion of a microfluidic device having a channel segment 207 in fluid communication with an aperture 210 aligned substantially centrally below the deformable membrane 202. Deformation of the membrane 202 towards channel segment 207 results in substantially complete blockage of fluid flow between channel segments 210 and 207. While similar devices can be constructed with the aperture disposed in various positions relative to the path of the deformable membrane, it is highly preferable to position the aperture near to the center of travel of the deformable a membrane to promote substantial blockage of the fluid flow path by the membrane. The size of the aperture will also affect the amount of pressure required to provide substantially leak-free sealing.

Using these techniques, a system can be constructed in which deformation of the material results in either partial blockage or substantially complete blockage of fluid flow through a channel segment. An elastic material may be used where reversible control of fluid flow is desired. Lowering the pressure in the higher relative pressure channel segment allows the deformable membrane to resume its neutral state, allowing unrestricted fluid flow. In certain applications, it is desirable to provide substantially permanent or irreversible change to a microfluidic channel segment. For example, it may be desirable for a system to provide shut-off valving utility to protect downstream components from damage caused by high flow or pressure. Upon increase in pressure in one channel segment, an inelastic material will be plastically deformed towards the channel segment with lower pressure. The material will remain substantially in the deformed position. Such results may be obtained with semi-malleable materials including suitable metal foils.

A deformable membrane also can be made of materials with surface properties that alter its behavior. For example, a membrane can be tacky or have an adhesive coating. Such properties or coatings can be applied to one or both sides of the deformable membrane. Depending on the strength of the adhesive or degree of tackiness, the deformable membrane can operate as a variable switch. At low relative pressures, the membrane can act elastically. At high pressures, or for systems designed for the deformable membrane to physically contact the opposing wall of the adjacent channel segment, the deformation can result in permanent or semi-permanent closure of the adjacent channel segment. In another embodiment, the membrane used can be non-adhesive, but the surface against which it seals can be constructed with a tacky or adhesive surface. For example, in FIG. 1B, the lower surface 107 of the deformable membrane 101 can be coated with an adhesive, or can be constructed from an adhesive tape, such that upon deformation sufficient to provided contact between the membrane 102 and the lower layer 104, the deformable membrane 102 can be affixed to the upper surface 108 of the lower layer 104. The degree of permanence of the closure depends on factors including elasticity of the membrane and the strength of the adhesive material used. Similar results can be achieved by coating the upper surface 108 with adhesive or both surfaces 107 and 108 with adhesive, or by forming one or more of these surfaces from single- or double sided self-adhesive tape materials. Referring to FIG. 1B, the bottom surface of the membrane 107 or the upper surface 108 of the bottom layer 104 may include permanent or semipermanent adhesives. When the membrane 102 is deformed, such as by an elevated pressure within the upper chamber 105, then the membrane 102 may be deformed to contact the lower layer 104 to permit the adhesive to bind the surfaces together and permanently or semi-permanently obstruct the lower channel segment 106.

In certain embodiments, the membrane 102 may be deformed and adhered to the lower surface in a semi-permanent manner that may be reversed by further manipulation. For example, when pressure is applied to 105, the membrane 102 is deformed so as to the contact the lower layer 104, where the membrane 102 and the upper surface 108 of the lower layer 104 are adhesively bound. Alternatively, the membrane 102 may be plastically deformed into the lower channel 106. When the pressure is re-equalized between the upper and lower chambers 105, 106, the membrane 102 will remain affixed to the lower layer 104 until sufficient pressure is applied to channel segment 106 to overcome the adhesive bond or plastic deformation of the membrane 102. In many cases, the pressure required to reposition (i.e., re-deform) the membrane 102 may be greater than the pressure to originally deform it.

In another embodiment, a microfluidic valve may include two microfluidic channels separated by a seating surface defining an aperture for mating with a deformable membrane to provide flow control utility. For example, FIGS. 12A–12B illustrate a microfluidic device 197 fabricated from seven layers 200-204, 220, 221 and having a control channel 205 bounded in part by a deformable membrane 202. With the deformable membrane in a relaxed, neutral state, fluid flow may be established between a first channel 207 and a second channel 222 defined in different layers 203, 220 of the device 197 and separated by a seating layer 204 defining an aperture 210. The deformable membrane 202 is disposed substantially centrally above the aperture 210 to promote tight sealing of the aperture when the control channel 205 is pressurized to deform the membrane 202 to contact the seating layer 204, as shown in FIG. 12B. The valve seating layer 210 adjacent to the aperture 210 may be considered a valve seating surface. The device 197 thus serves as a normally open valve that permits flow through the aperture when the deformable membrane is in an undeformed state. Selective pressurization of the control channel 205 permits closure of the valve. Either or both of the membrane 202 and the seating layer 204 may be provided with an adhesive surface to provide latching valve utility.

In further embodiments, more complex fluid control structures utilizing multiple membranes may be formed. For example, more than two channels can meet at a valve region separated by one or more membranes. In certain embodiments, more than one pressure regulator may be stacked in a given vertical position of a microfluidic device. In one embodiment, three channels overlap at a single valve region, with two deformable membranes separating the various channels. FIGS. 3A–3E show five cross-sectional views of such an overlap. FIG. 3A shows a cross-section of at least a portion of a microfluidic device 119 formed using sandwiched stencils, the device having seven layers 120–126 and forming three channel segment/chamber regions 127-129. In this embodiment, the central stencil layer 123 has a greater height than the other layers, and the layers 122 and 124 are flexible or deformable membranes. Fluid flow through the central channel segment 128 is affected by both the upper chamber region 127 and the lower chamber region 129. FIG. 3B shows the central channel segment 128 being partially blocked following a pressure increase within the upper chamber 127, causing deflection of the upper membrane 122 toward and into the central channel 128. FIG. 3C shows the channel segment 128 being substantially (almost completely) blocked following pressure increases in both the upper and lower chamber 127, 129, which cause both membranes 122, 124 to deform toward and into the central channel 128. FIG. 3D shows another operating state wherein the channel segment 128 is partially blocked following a pressure increase in the lower chamber region 129. In FIG. 3E, the central channel segment 128 is enlarged in response to a reduced pressure in both the upper and lower chambers 127, 129.

In the operation of a device of the invention, a differential pressure can be generated between a first and a second channel segment either by increasing the pressure in one channel segment, or through a relative decrease in pressure in one channel segment. The pressure of a fluid (encompassing both liquids and gases) can be increased by a pump such as, for example, a syringe or other mechanically operated pump. Reduced pressure can be achieved in the channel segment by applying a vacuum to a channel segment, for example using a vacuum pump. Where a channel segment is pressurized to greater than atmospheric pressure and a pressure reduction is desired, then the pressure can be reduced by venting the channel segment to the atmosphere or to a lower-pressure reservoir. Pressure can also be controlled by changing the temperature within one channel segment of the device. In such an embodiment, it is preferred that the fluid within the channel segment undergoes a large volume change with changing temperature. Preferably, in such an embodiment the fluid is a gas. The pressure can be increased by raising the temperature of the gas within the channel segment and can be decreased by lowering the temperature within the channel segment. The pressure within a channel segment also can be changed by processes such as vaporization or electrolysis (a process in which an electric current is used to break a liquid within a channel segment into gaseous components). For example, water may be electrolyzed into hydrogen gas and oxygen gas.

Microfluidic membrane valves may be actuated with means other than pressure. For example, a membrane can be moved within a device manually or with a mechanical actuator. Mechanical actuators include, for example, a piston, a solenoid, and a lever. The flexible membrane also can be coupled to a material that alters shape in response to a stimulus, for example, heat or an electric current. Titanium-Nickel composites are known that undergo large conformational changes in response to changes in temperature. Such a composite can be incorporated into the deformable membrane. When heated, as by passing an electric current through the composite, the composite will change shape and deflect the deformable membrane. The membrane also can be constructed of a magnetic material, or provided with a magnetic coating. As will be discussed further hereinafter, deformation of such a membrane can be achieved using an external magnet, including an electromagnet or an electric field generator.

Microfluidic membrane valves may be combined into more complex devices. The embodiments shown in FIGS. 3A–3E and others form the basics of microfluidic logic elements. For example, the embodiment shown forms a microfluidic AND/OR element. Consider measuring the flow in the central channel 128 at a constant backpressure. In FIG. 3A, the flow through the channel 128 may be considered to be 1 unit, in FIG. 3B about ½ of one unit, in FIG. 3C about 0 units, in FIG. 3D about ½ of one unit, and in FIG. 3E about 2 units. It follows that:

IF P127=P128 AND P128=P129

THEN Flow=1

IF P127=P128 AND P128<P129 OR IF P129=P128 AND P128<P127

THEN Flow=<1

IF P127>P128 AND P129>P128

THEN Flow=<<1

IF P127<P128 AND P129<P128

THEN Flow=>1

In another preferred embodiment, the flow control elements shown in FIGS. 3A–3E can be combined in a network in order to make a two dimensional fluid control system. Referring to FIG. 5A, a network of channels 150 are defined in the center layer of a three dimensional device. The channel network has multiple inlet ports 151 and outlet ports 152. Any given inlet port is in fluidic connection with all of the outlet ports in the unaltered layer. When assembled in a flow control device 180, the channels 150 depicted in FIG. 5A will be disposed between control channels and flexible membranes, such as the channel segment 128 shown in FIGS. 3A–3E.

Two control layers are also made within the device, one disposed above and one disposed below the channel network 150. Referring to FIG. 5B, the upper control layer of the three-dimensional device includes four vertical control channels 160–163, and the lower control layer of the device has four horizontal control channels 156–159. These control channels 160–163 and 156–159 overlap in specific regions 155. The cross-section of each of these overlap regions 155 are the same as those shown in FIGS. 3A–3E. Thus, control channels 160–163 are represented in cross section by the channel segment 127 in FIGS. 3A-3E and the control channels 156–159 are represented in cross section by the channel segment 129 of FIGS. 3A–3E.

Two flexible membranes, one disposed on either side of the channel network 150, separate the channel network 150 from the upper and lower control layers. These membranes may be homogeneous membrane layers, or they may be heterogeneous layers to permit the valving or flow control characteristics at any particular region to be "tuned." Examples of heterogeneous membrane layers are provided in FIGS. 5C–5D. In FIG. 5C, a first heterogeneous membrane layer 175 is composed of four membrane regions 175A–175D, any of which may be formed of different materials to provide desired response characteristics for each quadrant of four nodes or intersections of control channels. In FIG. 5D, a second heterogeneous membrane layer 176 is composed of sixteen membrane regions 176A–176P to permit the response characteristics for each individual overlap region 155 to be separately tuned if desired.

Referring to FIG. 5E, the various layers of the flow control device 180 may be assembled in the following order: a lower substrate, a lower control channel layer, a lower flexible membrane layer, a central channel network layer, an upper flexible membrane layer, an upper control channel layer, and finally an upper substrate or cover. In use, any given inlet port 151 can be connected to any given outlet port 152 by simply controlling the pressures of the control channels 160–163 and 156–159. This may be accomplished with a fluid control system 320 such as illustrated in FIG. 5F. There, the pressure to individual control channels 156–159 and 160–163 is supplied by two pressure sources 302, 304 and regulated by control valves 326A–326D and 328A–328D, which are preferably three-way valves or the equivalent to permit excess air to be released if necessary. Each valve 326A–326D and 328A–D is controlled by a controller 313. The controller 313 is preferably electronic, and more preferably microprocessor-based. The controller 313 may be programmed to execute complex, sequential or repetitive fluid functions on the device 180. One or more sensors 329 may be in sensory communication with the microfluidic flow control device 180 and coupled to the controller 313 to provide feedback and/or sensory data to be stored in or otherwise used by the controller. An input device 331 and display 332 may be coupled to the controller 313 to aid with programming and processing sensory data, among other functions.

An example showing operation of the microfluidic device 180 is shown in FIG. 5E. In this example, a pressure of 20 psi (138 kPa) is applied to control channel segment 157, negative 10 psi (69 kPa) is applied to control channel segment 160, and positive 10 psi (69 kPa) is applied to control channel segment 159. All of the other control channels are left at atmospheric pressure. All of the fluid channels under control channel segment 157 are blocked, because 10 psi (69 kPa) is sufficient to substantially block the channels. The valve regions of interest are 170, 171, and 172. At point 170, the upper control chamber has 20 psi (69 kPa), and the bottom control chamber has −10 psi (69 kPa) for a net of +10 psi (69 kPa), which is sufficient to locally block the fluid channel in network 150. At point 171, the bottom has negative 10 psi and the channel segment is opened more. At point 172, the +10 psi (69 kPa) applied to the top control channel equals the −10 psi (69 kPa) applied to the bottom control channel, and the central channel segment remains open. For the rest of the channels along the control channel 159, all are closed because they experience 10 psi (69 kPa).

Thus, the fluid supplied to the central channel layer 150 through the input ports 151 can only take the pathway shown by the arrow. Alternatively, any outlet port 152 can be reached by varying the pressure combinations to the control channels 156–159 and 160–163.

In a further embodiment, a flow control device can have more than one channel segment on a given layer at a regulatory region. As shown in FIGS. 7A–7B, a microfluidic device 699 includes two channel segments 706 and 707 defined in layer 703 and separated by a deformable membrane 702 from a channel segment 705 defined in an upper layer 701. The deformable membrane 701 is not adhered a seating region 703A defined in the layer 703. When the pressure in the channel segment 705 is high relative to both channels 706 and 707, then fluid communication between the channels 706 and 707 within the regulatory region is prevented by the membrane 702 pressed into contact with the seating region 703A, such as shown in FIG. 7A. If the relative pressures in both channels 706 and 707 are higher than that in the channel 705, such as shown in FIG. 7B, then the membrane 702 will deform toward and into the channel segment 705, thus allowing fluidic passage between the channels 706 and 707. Factors affecting whether an increased pressure in channel segments 706 or 707 is sufficient to open a flow path between the channels include the size of the seating region, the thickness and composition of the flexible membrane 702, and the size of the regulatory region (which affects the size of the membrane subject to deformation).

Flow Control Devices with Feedback

In further embodiments, pressure-sensitive regions may be integrated into a microfluidic device to provide internal feedback, such that a change in pressure or flow rate within one region of a channel segment will affect another region.

In a preferred embodiment, a feedback loop is used to create a pressure regulation device. A microfluidic device is constructed where a first channel segment located in one layer of a three-dimensional device is in fluid communication with a second channel segment in another layer of the device. For example, the two channels in distinct layers may be connected through a via or through-hole between layers. In an upper layer, one channel segment is positioned so that it passes back over the other channel segment in a lower layer. This upper section can pass over the lower region one or more times and can pass over the channel segment in parallel along its axis or cross the channel segment at an angle. A deformable membrane separates the two channel segments at a regulatory region. A pressure increase in the upstream part of the channel segment will cause the first channel segment to expand, thus compressing the overlapping downstream part of the channel segment. This will deform the membrane towards the second channel segment, altering the shape or geometry of the second channel segment. The flow through the second segment also can decrease, and will vary depending on the design of the regulatory region and with the pressure applied. The membrane can provide a partial blockage or a substantially complete blockage to fluid flow through one channel segment. A subsequent decrease in the pressure within the channel segment will result in said channel segment attaining its previously unrestricted or "relaxed" neutral state.

A pressure-activated valve can regulate flow between two channel segments in a single microfluidic channel because of the pressure-drop that occurs "downstream" in microfluidic channels. The pressure within a microfluidic channel decreases with distance from the inlet port. At low input pressures, there is a minimal pressure drop in a long channel segment. As the input pressure increases, it becomes more difficult for the internal pressures to equalize, and the pressure differential from one end of a channel segment to the other is much larger. The higher the operating pressure of the Microfluidic device, the greater the pressure differential generated over the length of a channel. Thus, by designing different microfluidic systems having valves separated by different lengths of channel between one side of the pressure membrane and the other, different shut-off pressures can be designed or "programmed" into the device. For example, in FIGS. 6A-6B (which is discussed in further detail below), a relatively long channel segment connects the one side of the shut-off valve membrane and the other; a long channel segment length is preferably provided to create the pressure differential.

A microfluidic device with a built in pressure regulation system is shown in FIGS. 4A–4B. Referring to FIG. 4A, a microfluidic device 130 was constructed using a sandwiched stencil fabrication method from five layers 131–135. The first layer 131 defines one inlet port 136 and two outlet ports 137, 138. The second layer 132 defines two vias 140 and a channel segment 139 having a nominal width of 40 mils (1000 microns). The third layer 133 defines a central via 141 and two lateral vias 142. The fourth layer 134 defines a channel 143 also having a nominal width of 40 mils (1000 microns). All of the vias are 70 mils in diameter. The layers 131–134 stencil layers are all constructed from 3 mil (75 microns) thickness single-sided tape comprising a polypropylene carrier with a water-based adhesive. The bottom stencil 100 is a 0.25 inch (6.3 mm) thick block of acrylic.

In use, fluid is injected at inlet port 136 at a low backpressure. The fluid passes through channel segment 139 until it reaches junction point 144. The fluid then splits evenly down the two parts of channel segment 143 until it reaches the outlet ports 137 and 138. As fluid continues to flow, the fluid splits evenly at the junction point 144 and is divided evenly. When increased pressure was applied at the entry port 136, the pressure within the channel segment increased, as did the flow rate. In the region 145 where channels 139 and 143 overlap, the pressure in the upper channel segment 139 pushes on the polymeric membrane 133 that separates the two channels. The polymer material 133 is locally deformed and partially blocks the lower channel segment 143, thus partially restricting the flow in that channel segment.

In a preferred embodiment directed to this example, the size of the exit channels are adjusted such that the flow out of the device 130 remains constant no matter what backpressure is applied. This device 130 may be used in various applications, including but not limited to constant delivery of materials such as in drug delivery applications. In a preferred embodiment, inlet port 136 is connected to a pressurized container of fluid (not shown) that contains a drug of interest. The outlet ports 137, 138 are connected to a delivery mechanism to a body. When the pressurized container is full, the backpressure is high and the outlet 137 is closed and 138 is open. Although the pressure remains high, the resistance in the channels is even higher since there is only one outlet. As the pressurized body loses fluid, the pressure decreases which permits the exit port 137 to slowly open. As the pressure drops, the resistance in the channels decreases since two channels are now open. A more complicated structure with many feedback loops can be constructed so that approximately constant flow can be maintained over a large range of input pressures.

In a further embodiment, a microfluidic device was constructed to regulate flow rate over a large range of input pressures. Referring to FIGS. 6A–6B, a microfluidic flow regulation device 199 was constructed using a stencil fabrication method from five layers 200–204. Starting from the bottom, the first layer 204 defined one inlet port 209 and two outlet ports 210, 211. The second layer 203 defined a via 214 and a channel 206 terminating at a chamber 207. The third layer 202 defined two vias 208, 208A. The fourth layer 201 defined a channel 205 and connected chamber 215. The fifth layer 200 served as a cover for the fourth layer 201. The assembled device is shown in FIG. 6B. The overlap region 212 is shown in cross section in FIGS. 6C–6D with the valve in open and closed positions, respectively. In use, fluid is injected into the inlet port 209. The fluid travels through the vias 214, 208, through channel segment 205, down through the via 208A and the channel 206 and is split towards the two exit ports 210 and 211. When the inlet pressure is relatively low, the flexible membrane 202 is not substantially deformed (see FIG. 6C) and the fluid passes evenly out of the two exit ports 210, 211. As the pressure at the inlet is increased, the pressure in the channel 205 and chamber 215 increases, thus deforming the membrane 202 (see FIG. 6D) and partially blocking the outlet port 210.

Two sets of experiments were performed with this device 199. In the first experiment, the pressure versus flow characteristic of the two exit ports 210 and 211 were measured independently. One of the exit ports was completely blocked, and the pressure at the inlet 209 versus flow at the outlet was measures. Referring to FIG. 6E, for exit port 211 (unregulated), the flow rate increases as the pressure increases, as would be expected. However, for the (regulated) exit port 210, as the pressure increases above 3 psi (21 mPa), the membrane 202 is deformed, resulting in a constricted channel segment. The device 199 acts as a flow regulator. As the pressure increases further, the flow remains constant since flow is proportional to pressure and channel segment dimension. As the pressure increases, the channel segment dimension decreases, resulting in substantially constant flow rates.

The same experiment was repeated when both channels were measured simultaneously. The results of this experiment are provided in FIG. 6F. Again, the flow is regulated, but in this case, the flow is regulated to an even lower flow rate.

A structure substantially similar to that illustrated in FIGS. 6C–6D is provided in FIGS. 12A–12B, with the primary difference being the addition of outlet channels 222 defined by stencil layer 220 and a substrate 221 to continue flow within the device 197.

Magnetically Actuated Flow Control Devices

In another embodiment, a flow control device such as a valve is magnetically actuated. Generally, magnetic actuation requires a field generator and a magnetic (i.e, paramagnetic or ferromagnetic) element. The magnetic element moves in response to application of a magnetic field, with the direction of motion of the magnetic element depending on the direction of the applied magnetic field. Opening or closing force of a magnetically actuated valve may be adjusted by varying the magnitude of the applied magnetic field, or selecting a magnetic element with appropriate response characteristics (e.g., magnetization). For example, if strong magnetization is desirable, then magnetic elements formed from rare earth magnetic materials may be used.

Preferably, at least one magnetic element is integrated into a microfluidic flow control device and used in conjunction with a deformable membrane. In a preferred embodiment, a deformable membrane includes one or more discrete magnetic elements. A discrete magnetic element may be attached to a deformable membrane using various means including adhesives and mechanical retention. For example, FIG. 8A illustrates a magnetic element 400 affixed to a deformable membrane 401 using an adhesive. In a more preferred embodiment shown in FIG. 8B, a discrete magnetic element 402 is sandwiched between multiple deformable membrane layers 403, 404. Contact between the layers 403, 404 and the magnetic element 402 may be maintained with an adhesive, such as if one of the layers 403 is formed of a self-adhesive tape material. Further preferably, as shown in FIG. 8C, a central membrane layer 407 may be a stencil layer defining an aperture into which a magnetic element 405 may be inserted. Multiple membrane layers 406–408 may be laminated together using conventional bonding methods such as, for example, adhesive or thermal bonding. In a preferred embodiment, at least one membrane layer containing the discrete magnetic element comprises a self-adhesive tape material. Adhesiveless films of deformable materials such as latex, polypropylene, polyethylene, and polytetrafluoroethylene are readily available in thicknesses of approximately 0.5 mil (13 microns) or less. If supplied as self-adhesive tape, such materials are readily available with a total (carrier plus adhesive) thickness between approximately 1.5 and 2.0 mils (38 to 50 microns). An embodiment such as shown in FIG. 8B may thus be provided with a combined membrane thickness of approximately 2.0 to 2.5 mils (50 to 63 microns). In an embodiment such as shown in FIG. 8C, the central layer 407 may be a stencil layer formed of contact adhesive, so as to form a laminated membrane of approximately the same total thickness as before (approximately 2.0 to 2.5 mils, or 50 to 63 microns).

A discrete magnetic element to be integrated with a membrane layer may be provided in any size or shape sufficient to promote the desired flow control characteristics. If the flow control device utilizes a valve seat of a particular geometry, then the desired shape and size of the magnetic element is preferably selected to interface with the valve seat geometry. Particular shapes of magnetic elements that may be used include cylindrical, spherical, or annular shapes. A valve seat may include an aperture that may be selectively sealed to control fluid flow. Preferably, the membrane may be deformed by magnetic force to seal the aperture, thus preventing fluid flow. Alternatively, an annular magnetic element may be disposed adjacent to an aperture defined in a membrane, so that under certain conditions fluid is permitted to flow through both the membrane aperture and the annular magnetic element. This fluid flow path may be selectively blocked or re-established through application of a magnetic field that deforms the membrane against a valve seating surface.

As an alternative to using one or more discrete magnetic elements, a flexible membrane comprising a diffuse magnetic layer may be provided. If a diffuse magnetic layer is used, then it is preferably coupled to a deformable membrane selected for desirable material properties such as chemical compatibility or sealing characteristics.

The magnetic field generator preferably comprises a coil of current-carrying wire, preferably insulated wire. Current may selectively applied to the coil, such as by using an external current source, to generate a magnetic field. The strength of the magnetic field may be adjusted by varying the magnitude of the current and the number of turns of wire. The direction of the resulting magnetic field is parallel to the central axis of the coil. In a more preferred embodiment, a field-concentrating element, such as a ferromagnetic core, is provided along the central axis of the coil. A magnetic field generator 425 having a field-concentrating element 427 and a coil of insulated wire 426 is shown in FIGS. 9A–9B. The field-concentrating element 427 is preferably substantially cylindrical in shape, and if a highly focused field is desired then the cylinder should be of a small diameter. The current-carrying wire 426 may be directly wrapped around the field-concentrating element 427.

As further shown in FIGS. 9A–9B, a magnetically actuated membrane valve is operated by selectively applying current to the coil 426. To deform the membrane 411 (formed from laminated layers 411A–411C and magnetic element 417) in one direction, current in one direction is applied to the coil 426. To reverse the travel of the membrane 411, current is applied in the opposite direction. FIG. 9A shows the membrane 411 in a relaxed position, with the field generator 425 substantially centered above the magnetic element 417, which in turn is substantially centered over an aperture 420 permitting fluid communication between a first channel segment 418 and a second channel segment 419 within a microfluidic flow control device 410. The flow control device 410 is formed from a three-layer composite membrane 411 and four other device layers 413–416. FIG. 9B shows the membrane 411 in a deformed position and contacting the seating layer 414 adjacent to the aperture 420 to prevent fluid flow between the first channel segment 418 and the second channel segment 419.

In a preferred embodiment, multiple magnetically actuated flow control valves may be integrated into a single microfluidic device. Referring to FIG. 10, a microfluidic flow control device 430 includes at least one flexible membrane and multiple discrete magnetic elements 431. Preferably, the device 430 may be used to manipulate fluid between multiple fluidic inlet ports 432 and multiple outlet ports 433. A magnetic field generator array 435 having multiple coils and field concentrating elements 436 may be positioned in relatively close proximity to the microfluidic flow control device 430 to manipulate fluid within the device 430. However, the field generator array 435 preferably does not contact the microfluidic device 430. Preferably, one coil and field focusing element 436 is provided and paired with each magnetic element 431. One advantage of using field focusing elements in such a device is to minimize unwanted interference between unpaired coils and magnetic elements. High density arrays of field generators may thus be used to provide precise control over fluid flowing in a small area. Complex operation of a fluidic system can thus be provided without requiring any external to ever physically contact the device 430. For example, utility similar to that described in connection with FIGS. 5A–5F may be provided.

Various elements of a magnetically actuated microfluidic flow control system 450 and their interconnections are illustrated schematically in FIG. 11. Preferably, a controller 442 is provided to selectively apply currents to the various field generator coils 436, such as may be contained in a field generator array 435. The controller 442 is preferably electronic, and more preferably is microprocessor-based, and receives power from a power source 444. In a preferred embodiment, the controller 442 is programmable to permit execution of complex, repetitive and/or sequential functions with minimal user interaction. Preferably, one or more sensors 440 are included in sensory communication with the microfluidic device 430 to provide feedback and/or useful data to the controller 442. Suitable sensors may include, for example, pressure sensors, flow sensors, optical sensors, and displacement sensors. If the provided sensors are capable of inferring fluid flow, then the system may be used to provide flow regulation utility. More specifically, feedback from a flow sensor may be provided to the controller 442, which in turn may provide an analog signal to one or more field generators to regulate flow. Alternatively, pressure regulation utility may be provided in a similar fashion. An input device 446 and display 448 are preferably coupled to the controller 442 to aid in programming and/or analyzing data generated by the system 450.

The particular devices and construction methods illustrated and described herein are provided by way of example only, and are not intended to limit the scope of the invention. The scope of the invention should be restricted only in accordance with the appended claims and their equivalents.

What is claimed is:

1. A microfluidic regulating device comprising:
    a first channel segment defined in a first layer of the device and containing a fluid flow;
    a second channel segment defined in a second layer of the device, the second channel segment being in fluid communication with the first channel segment; and
    a membrane separating the first channel segment and the second channel segment at a regulatory region;

wherein the presence of a pressure differential between the first channel segment and the second channel segment causes the membrane to deform into the channel segment having a lower internal pressure, thus reducing fluid flow capability through the first channel segment or the second channel segment.

2. The microfluidic regulating device of claim 1 wherein first layer and the second layer are stencil layers, with the first channel segment being defined through the entire thickness of the first layer and the second channel segment being defined through the entire thickness of the second layer.

3. The microfluidic regulating device of claim 1 wherein the first channel is defined in a lower surface of the first layer and the second channel is defined in an upper surface of the second layer.

4. The microfluidic regulating device of claim 1 wherein at least one of the first device layer, the second device layer, and the membrane has an adhesive surface.

5. The microfluidic regulating device of claim 1 wherein at least one of the first device layer, the second device layer, and the membrane comprises a self-adhesive tape material.

6. The microfluidic regulating device of claim 4 wherein, when a pressure differential of sufficient magnitude is attained, the deformable membrane contacts and adheres to either the first device layer or the second device layer.

7. The microfluidic regulating device of claim 1 wherein the membrane is elastically deformable.

8. The microfluidic regulating device of claim 1 wherein the membrane comprises a polymeric material selected from the group consisting of polyesters, polycarbonates, polytetrafluoroethylenes, polypropylenes, polyimides, polysilanes, polymethylmethacrylates, and polyesters.

9. A multi-layer microfluidic regulating device comprising:
a first channel segment defined in a first layer of the device and containing a fluid flow;
a second channel segment defined in a second layer of the device, the second channel segment being in fluid communication with the first channel segment; and
a membrane separating the first channel segment and the second channel segment at a regulatory region;
wherein the presence of a pressure differential between the first channel segment and the second channel segment causes the membrane to deform into and constrict the channel segment having a lower internal pressure.

10. The microfluidic regulating device of claim 9 wherein first layer and the second layer are stencil layers, with the first channel segment being defined through the entire thickness of the first layer and the second channel segment being defined through the entire thickness of the second layer.

11. The microfluidic regulating device of claim 9 wherein at least one of the first device layer, the second device layer, and the membrane has an adhesive surface.

12. The microfluidic regulating device of claim 11 wherein, upon attainment of a sufficient pressure differential, the deformable membrane contacts and adheres to either the first device layer or the second device layer.

13. The microfluidic regulating device of claim 9 wherein the membrane comprises a polymeric material.

14. A microfluidic regulating device comprising:
a first device layer having a characteristic thickness;
a first channel segment defined through the entire thickness of the first device layer;
a second device layer having a characteristic thickness;
a second channel segment defined through the entire thickness of the second device layer, the second channel having an inlet and a regulated outlet;
wherein the first channel segment is in fluid communication with the inlet; and
a pressure responsive deformable membrane disposed between at least a portion of the first channel segment and a portion of the second channel segment.

15. The microfluidic regulating device of claim 14, further comprising an unregulated outlet in fluid communication with the second channel segment.

16. The microfluidic regulating device of claim 15 wherein:
upon introduction of fluid into the first channel segment at a positive inlet pressure, fluid flows from the regulated outlet at a first outlet pressure and flows from the unregulated outlet at a second outlet pressure, the second outlet pressure being substantially higher than the first outlet pressure.

17. The microfluidic regulating device of claim 15 wherein:
upon introduction of fluid into the first channel segment at a first inlet pressure, fluid flows from the unregulated outlet at a first outlet pressure and from the regulated outlet at a second outlet pressure, the first outlet pressure and the second outlet pressure being substantially equal; and
upon introduction of fluid into the first channel segment at a second inlet pressure that is substantially higher than the first inlet pressure, fluid flows from the regulated outlet at a third outlet pressure and flows from the unregulated outlet at a fourth outlet pressure, the fourth outlet pressure being substantially higher than the third outlet pressure.

18. The microfluidic regulating device of claim 17 wherein the second outlet pressure is substantially the same as the third outlet pressure.

19. The microfluidic regulating device of claim 15 wherein:
the portion of the second channel between the junction point and the unregulated outlet defines a first fluid impedance;
the portion of the second channel between the inlet and the regulated outlet defines a second fluid impedance;
upon introduction of fluid into the first channel segment at a first inlet pressure, the first fluid impedance is substantially the same as the second fluid impedance, fluid flows from the unregulated outlet at a first outlet pressure, and fluid flows from the regulated outlet at a second outlet pressure, the first outlet pressure and the second outlet pressure being substantially equal; and
upon introduction of fluid into the first channel segment at a second inlet pressure that is substantially higher than the first inlet pressure, fluid flows from the regulated outlet at a third outlet pressure and fluid flows from the unregulated outlet at a fourth outlet pressure, the fourth outlet pressure being substantially higher than the third outlet pressure.

20. The microfluidic regulating device of claim 19 wherein the second outlet pressure is substantially the same as the third outlet pressure.

21. The microfluidic regulating device of claim 14 wherein at least one of the first device layer, the second device layer, and the membrane has an adhesive surface.

22. The microfluidic regulating device of claim 14 wherein at least one of the first device layer, the second device layer, and the membrane comprises a self-adhesive tape material.

23. The microfluidic regulating device of claim 21 wherein, upon attainment of a sufficient pressure differential across the membrane, the membrane contacts and adheres to either the first device layer or the second device layer.

24. The microfluidic regulating device of claim 14 wherein the membrane is elastically deformable.

25. The microfluidic regulating device of claim 14 wherein the membrane comprises a polymeric material selected from the group consisting of: polyesters, polycarbonates, polytetrafluoroethylenes, polypropylenes, polyimides, polysilanes, polymethylmethacrylates, and polyesters.

26. The microfluidic regulating device of claim 15 wherein:
  upon introduction of fluid into the first channel segment at an inlet flow rate, fluid flows from the regulated outlet at a first outlet flow rate and flows from the unregulated outlet at a second outlet flow rate, the second outlet flow rate being substantially higher than the first outlet flow rate.

27. The microfluidic regulating device of claim 15 wherein:
  upon introduction of fluid into the first channel segment at a first inlet flow rate, fluid flows the unregulated outlet at a first outlet flow rate and the regulated outlet at a second outlet flow rate, the first outlet flow rate and the second outlet flow rate being substantially equal; and
  upon introduction of fluid into the first channel segment at a second inlet flow rate that is substantially higher than the first inlet flow rate, fluid flows from the regulated outlet at a third outlet flow rate and flows from the unregulated outlet at a fourth outlet flow rate, the fourth outlet flow rate being substantially higher than the third outlet flow rate.

28. A microfluidic regulating device comprising:
  a first device layer having a first characteristic thickness;
  a first channel defined through the entire thickness of the first device layer, wherein the first channel has a first inlet and a first outlet;
  a second device layer having a second characteristic thickness;
  a second channel defined through the entire thickness of the second device layer, wherein the second channel has a second inlet, a second outlet, and a third outlet; and
  a third device layer having a third characteristic thickness and defining an aperture through the entire thickness of the third device layer;
  wherein the third device layer is disposed between the first device layer and the second device layer to establish fluid communication between the first outlet and the second inlet through the aperture; and
  wherein at least a portion of the first channel overlaps a portion of the second channel to form a regulatory region associated with either the second outlet or the third outlet.

29. The microfluidic regulating device of claim 28 wherein at least one of the first device layer, the second device layer, and the third device layer has an adhesive surface.

30. The microfluidic regulating device of claim 28 wherein at least one of the first device layer, the second device layer, and the third device layer comprises a self-adhesive tape material.

31. The microfluidic regulating device of claim 29 wherein:
  at least a portion of the third device layer adjacent to the regulatory region comprises a deformable membrane; and
  upon attainment of a sufficient pressure differential, the deformable membrane contacts and adheres to either the first device layer or the second device layer.

32. The microfluidic regulating device of claim 28 wherein the membrane comprises a polymeric material selected from the group consisting of: polyesters, polycarbonates, polytetrafluoroethylenes, polypropylenes, polyimides, polysilanes, polymethylmethacrylates, and polyesters.

* * * * *